(12) United States Patent
    Khwa et al.

(10) Patent No.: US 12,675,548 B2
(45) Date of Patent: Jul. 7, 2026

(54) BITWISE PRODUCT-SUM ACCUMULATIONS WITH SKIP LOGIC

(71) Applicant: Taiwan Semiconductor Manufacturing Co., Ltd., Hsinchu (TW)

(72) Inventors: Win-San Khwa, Taipei (TW); Yen-Cheng Chiu, Hsinchu (TW); Je-Min Hung, Kaohsiung (TW); Meng-Fan Chang, Taichung (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 1134 days.

(21) Appl. No.: 17/679,260

(22) Filed: Feb. 24, 2022

(65) Prior Publication Data

US 2023/0053294 A1     Feb. 16, 2023

Related U.S. Application Data

(60) Provisional application No. 63/254,574, filed on Oct. 12, 2021, provisional application No. 63/232,915, filed on Aug. 13, 2021.

(51) Int. Cl.
    *G06F 17/16*        (2006.01)
    *G06F 7/544*        (2006.01)
    (Continued)

(52) U.S. Cl.
    CPC ............ *G06F 17/16* (2013.01); *G06F 7/5443* (2013.01); *G06N 3/0464* (2023.01); *G06N 3/048* (2023.01); *G06N 3/063* (2013.01)

(58) Field of Classification Search
    CPC ..... G06F 17/16; G06F 7/5443; G06N 3/0464; G06N 3/048; G06N 3/063
    See application file for complete search history.

(56) References Cited

U.S. PATENT DOCUMENTS

| | | | |
|---|---|---|---|
| 4,142,242 A | 2/1979 | Duvochel et al. | |
| 5,657,262 A | 8/1997 | Curtet | |
| | (Continued) | | |

FOREIGN PATENT DOCUMENTS

| | | |
|---|---|---|
| CN | 113168324 A | 7/2021 |
| JP | H10187648 A | 7/1998 |
| | (Continued) | |

OTHER PUBLICATIONS

Chang, J. NPL: "Reducing MAC operation in convolutional neural network with sign prediction" (https://ieeexplore.ieee.org/stamp/stamp.jsp?tp=&arnumber=8539530) (Year: 2018).*

(Continued)

*Primary Examiner* — Andrew Caldwell
*Assistant Examiner* — Carlos Heberto De La Garza
(74) *Attorney, Agent, or Firm* — Slater Matsil, LLP

(57)        ABSTRACT

A method, device, and system for performing a partial sum accumulation of a product of input vectors and weight vectors in a wordwise-input and bitwise-weight manner results in a partial accumulated product sum. The partial accumulated product sum is compared with a threshold condition after each weight bit, and when the partial accumulated product sum meets the threshold condition, a skip indicator is asserted to indicate that remaining computations of a sum accumulation are skipped.

20 Claims, 28 Drawing Sheets

(51) Int. Cl.
| | |
|---|---|
| *G06N 3/0464* | (2023.01) |
| *G06N 3/048* | (2023.01) |
| *G06N 3/063* | (2023.01) |

(56) References Cited

U.S. PATENT DOCUMENTS

| | | | | |
|---|---|---|---|---|
| 8,090,758 | B1 * | 1/2012 | Shimanek | G06F 7/5443 |
| | | | | 708/523 |
| 11,693,796 | B2 * | 7/2023 | Whatmough | G06F 13/1668 |
| | | | | 710/314 |
| 12,456,030 | B2 * | 10/2025 | Lin | G06F 17/15 |
| 2018/0157465 | A1 | 6/2018 | Bittner et al. | |
| 2020/0159529 | A1 | 5/2020 | Sen et al. | |
| 2021/0073619 | A1 | 3/2021 | Wang et al. | |
| 2021/0264247 | A1 * | 8/2021 | Kang | G06N 3/04 |

FOREIGN PATENT DOCUMENTS

| | | |
|---|---|---|
| TW | 469693 B | 12/2001 |
| WO | 2021050440 A1 | 3/2021 |

OTHER PUBLICATIONS

Chen, X. NPL: "CompRRAE: RRAM-based Convolutional Neural Network Accelerator with Reduced Computations through a Run-time Activation Estimation" (https://arxiv.org/pdf/1906.03180) (Year: 2019).*

* cited by examiner $$y = \begin{cases} x, & x > 0 \\ 0, & x \leq 0 \end{cases}$$

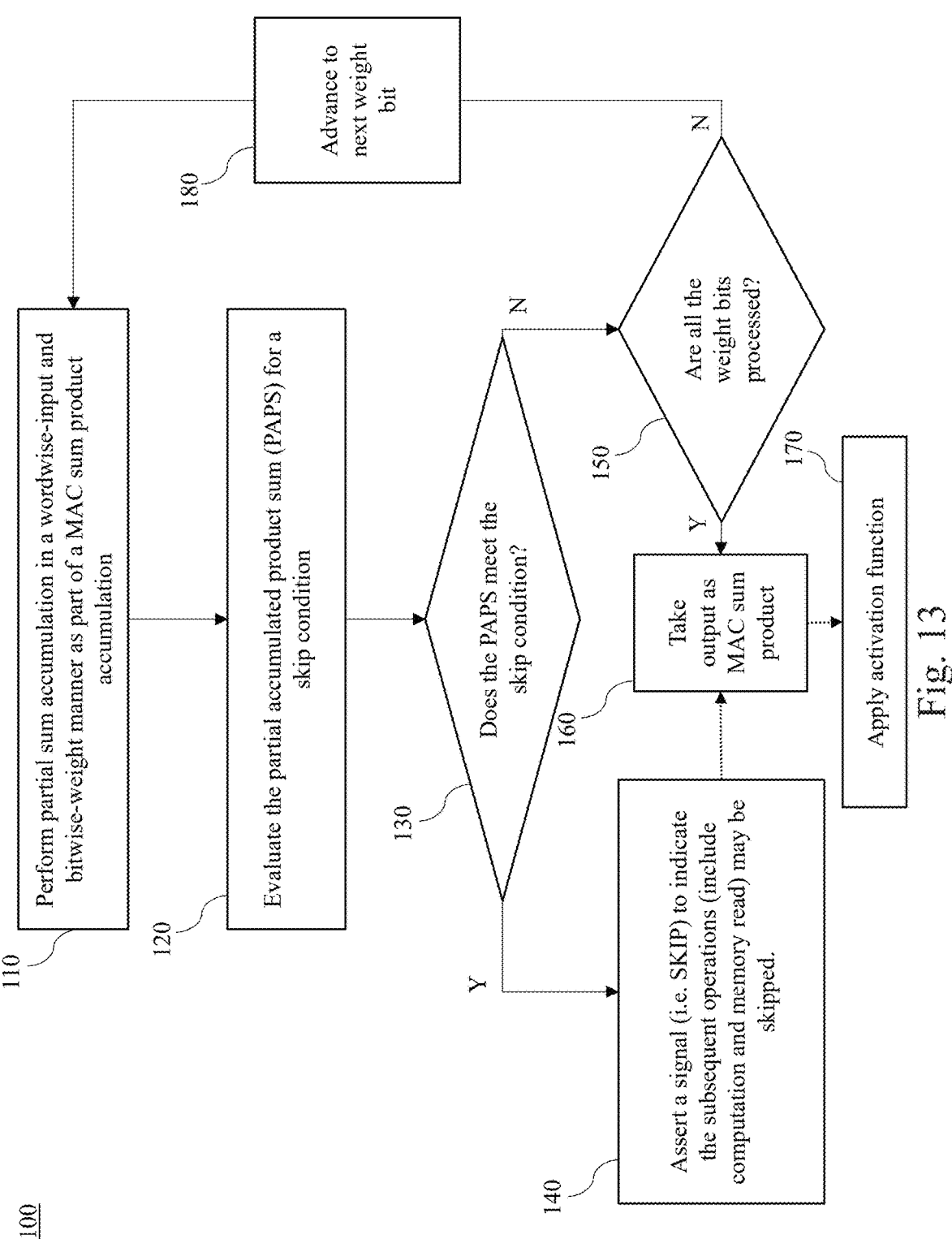

100

110 — Perform partial sum accumulation in a wordwise-input and bitwise-weight manner as part of a MAC sum product accumulation 120 — Evaluate the partial accumulated product sum (PAPS) for a skip condition 130 — Does the PAPS meet the skip condition?

N

140 — Assert a signal (i.e. SKIP) to indicate the subsequent operations (include computation and memory read) may be skipped.

160 — Take output as MAC sum product

150 — Are all the weight bits processed?

Y

N

180 — Advance to next weight bit

170 — Apply activation function

Fig. 13

| ST | MAC Actions | Skip Actions | Memory Actions | Next states |
|----|-------------|--------------|----------------|-------------|
| 0 | Idle | Idle | Idle | IF (RST=0 && NEXT && START=1) then ST=1 |
| 1 | Latch INPUT vectors | Allow INPUT vextors to flow through the multipler | Memory reads INPUT vectors | IF (RST=0 && NEXT ) then ST=2 |
| 2 | | Latch sum of Input vectors into IS_FF | | IF (RST=0 && NEXT ) then ST=3 |
| 3 | Latch Weight vector MSB | Latch sum of Input vectors into Shift Register | Memory reads MSB bit of Weight vectors | IF (RST=0 && NEXT ) then ST=4 |
| 4 | Multiply INPUT vector by Weight vector current bit<br>Sum weighted INPUT vectors<br>Sum with previous accumulated intermediate data<br>Increase bit-Counter | | | IF (RST=0 && NEXT ) then ST=5 |
| 5 | Latch new accumulated intermediate data | Compare accumulated intermediate data | | IF (RST=0 && NEXT ) then ST=6 |
| 6 | | Latch skip result | | IF (RST=0 && NEXT ) then ST=7 |
| 7 | Left-shift accumulated intermediated data<br>Latch Weight vector next bit | Left-shift Shift Register | Memory reads next bit of Weight vectors | IF (RST=0 && NEXT && CNT=7) OR (SKIP=1) then ST=0<br><br>ELSEIF (RST=0 && NEXT && CNT!=7) then ST=4 |

Fig. 24B

| | 0 | 1 | 2 | 3 | 4 | 5 | 6 | 7 |
|---|---|---|---|---|---|---|---|---|
| Current State | 000 | 001 | 010 | 011 | 100 | 101 | 110 | 111 |
| RST | 1 | 0 | 0 | 0 | 0 | 0 | 0 | 0 |
| START | 0 | 1 | 0 | 0 | 0 | 0 | 0 | 0 |
| NEXT | 1 | 1 | 1 | 1 | 1 | 1 | 1 | 1 |
| Next State | 000 (START=0) 000 (START=1) | 010 | 011 | 100 | 101 | 110 | 111 | 000 (JP_0=0 or SKIP=1) 100 (JP_4=1) |
| IN_LAT | 0 | 1 | 0 | 0 | 0 | 0 | 0 | 0 |
| W_LAT | 0 | 0 | 0 | 1 | 0 | 0 | 0 | 1 |
| ACC_LAT | 0 | 0 | 0 | 0 | 0 | 1 | 0 | 0 |
| ACC_SHIFT | 0 | 0 | 0 | 0 | 0 | 0 | 0 | 1 |
| ADD | 0 if CNT=1 1 if CNT!=1 | 0 if CNT=1 1 if CNT!=1 | 0 if CNT=1 1 if CNT!=1 | 0 if CNT=1 1 if CNT!=1 | 0 if CNT=1 1 if CNT!=1 | 0 if CNT=1 1 if CNT!=1 | 0 if CNT=1 1 if CNT!=1 | 0 if CNT=1 1 if CNT!=1 |
| CNT_plus | 0 | 0 | 0 | 0 | 1 | 0 | 0 | 0 |
| OUT_RDY | 1 | 0 | 0 | 0 | 0 | 0 | 0 | 0 |
| Flow_Thru | 0 | 1 | 1 | 0 | 0 | 0 | 0 | 0 |
| Skip FF_LAT | 0 | 0 | 1 | 0 | 0 | 0 | 0 | 0 |
| Skip SR_LAT | 0 | 0 | 0 | 1 | 0 | 0 | 0 | 0 |
| Skip SHIFT | 0 | 0 | 0 | 0 | 0 | 0 | 0 | 1 |
| Skip_LAT | 0 | 0 | 0 | 0 | 0 | 0 | 0 if CNT=1 1 if CNT!=1 | 0 |

Fig. 25

BITWISE PRODUCT-SUM ACCUMULATIONS WITH SKIP LOGIC

PRIORITY CLAIM AND CROSS-REFERENCE

This application claims the benefit of U.S. Provisional Application No. 63/232,915, filed on Aug. 13, 2021, and U.S. Provisional Application No. 63/254,574, filed on Oct. 12, 2021, which applications are hereby incorporated herein by reference.

BACKGROUND

Multiply accumulators may be used to multiply input data by respective weighting data in a word-wise bit-wise manner. The output of such an operation can be used in artificial intelligence networks to form connections between nodes. In such cases, the output of a multiply accumulate may be provided to an activation function. One such activation function is the rectified linear unit or ReLU activation function. If the input to the function is less than 0, then a 0 is returned, otherwise the value is returned.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 13 illustrates a process flow diagram 100 for the skip evaluation and activation feature, in accordance with some embodiments.

FIGS. 24A, 24B, and 25 illustrates state machine models and signal values, in accordance with some embodiments.

DETAILED DESCRIPTION

Figure 1:
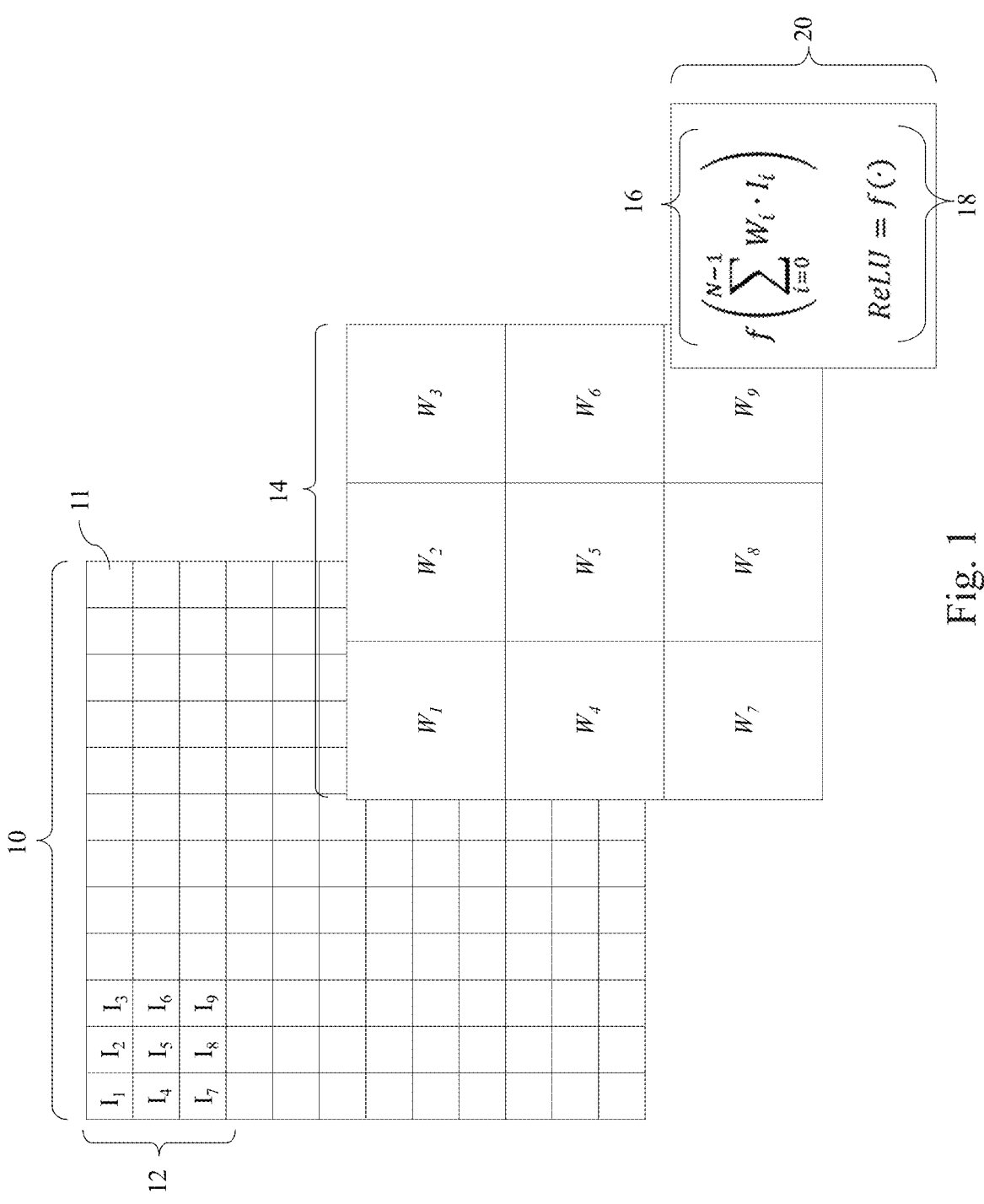
FIG. 1 illustrates an example of a 3×3 convolution which is often used in processing image data in machine learning, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. It should be appreciated that signals may be asserted high 1 or low 0, and that '1' as used herein is understood to mean 'asserted' unless otherwise stated by context or convention, and that '0' as used herein is understood to mean 'unasserted' unless otherwise stated by context or convention. One of skill in the art can readily invert these signals as needed depending on the devices and designs.

In the area of artificial neural networks, machine learning takes input data, performs some calculation on the input data, and then applies an activation function to process the data. The output of the activation function is essentially some simplified representation of the input data. The input data can be a node of data in a layer of nodes. FIG. 1 illustrates an example of a 3×3 convolution which is often used in processing image data in machine learning. An image 10 is made of individual pixels 11. Images can be represented in a color space, such as RGB (red-green-blue) or HSL (hue-saturation-luminescence), with one value for each of the color-space variables being assigned for each pixel. A node 12 of the image is a 3×3 block of pixels, with each pixel 11 in the node 12 having an input value I1-9 for each of the color-space variables of the pixels 11 of the node 12. One possible computation in a 3×3 convolution uses a product-sum calculation, where each input value I1-9 is respectively multiplied by weighting values W1-9 of a weighting matrix 14. As each multiplication is made, a running sum total can be kept of each of the products. Such a product-sum calculation may be referred to as a multiply accumulate computation/calculation (MAC) 16. The output of the MAC 16 included in calculation 20 is provided to an activation function 18 included in calculation 20. In a 3×3 convolution, the activation function used is often a rectified linear activation function (rectified linear unit or ReLU). The ReLU is a piecewise function that outputs y=max (0, x), where x is the result of the MAC 16. Thus, all negative values are set to o and the non-zero values are a linear identity of the input.

Figure 2:
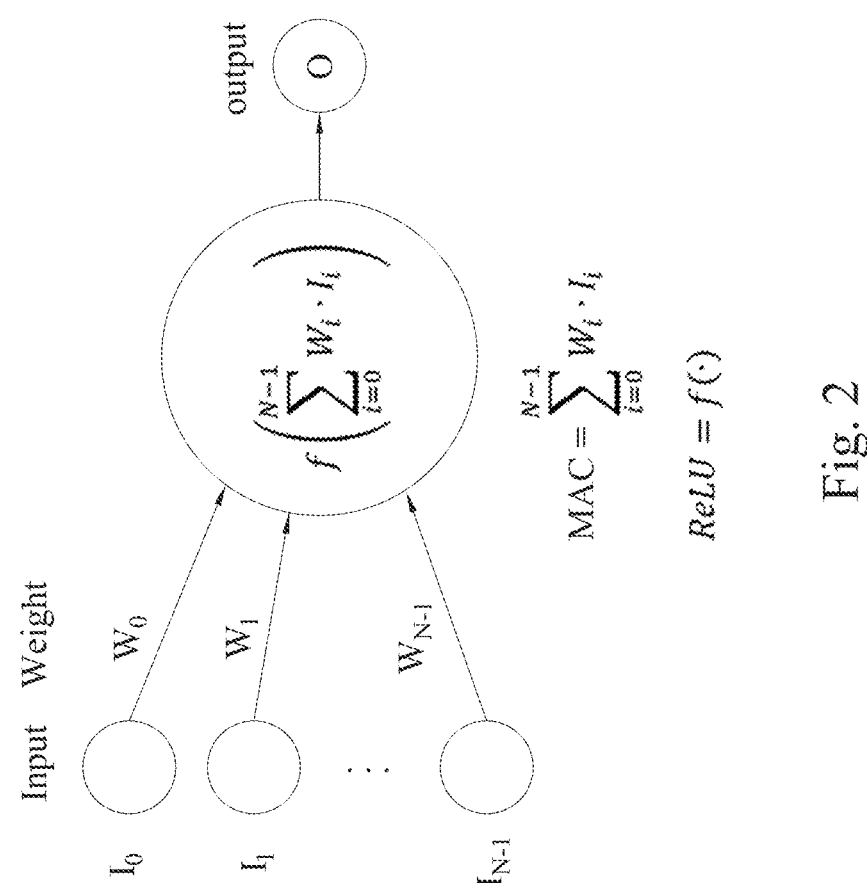
FIG. 2 illustrates the concept illustrated in FIG. 1 in a more general manner, in accordance with some embodiments.

FIG. 2 illustrates the concept illustrated in FIG. 1 in a more general manner, i.e., for any length input node. Each of the inputs $I_0$-$I_{N-1}$ is respectively multiplied by a weighting vector $W_0$-$W_{N-1}$. Then these values are summed in a product-sum calculation (the MAC) and subjected to the ReLU activation function. The output O is the output of the ReLU activation function.

Figure 3:
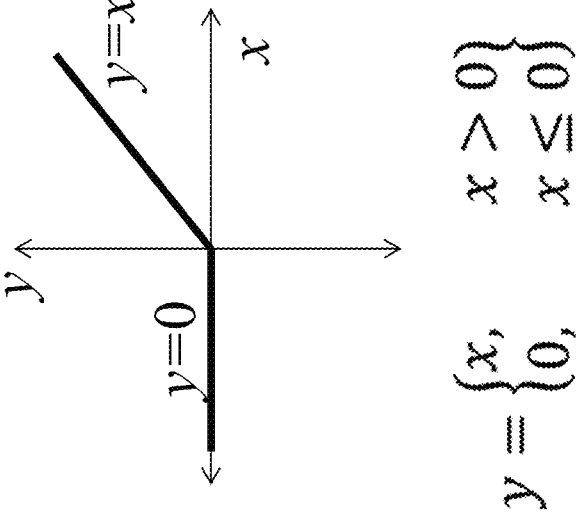
FIG. 3 illustrates a ReLU activation function, in accordance with some embodiments.

FIG. 3 illustrates a graph of the ReLU activation function and a piecewise function representation of the ReLU activation function. As seen in the graph of FIG. 3, for all values of x≤0 the value of y=0 and for all values of x>0 the value of y=x. Notably, in this case, if the value of x is equal to zero the output is '0' no matter which piece of the function is used (so the output is equal if the function is defined instead as y={x, x≥0|0, x<0}). Several modifications may be made to the ReLU activation function.

So far, these computations have been discussed in a general sense. For example, one could write a computer program to be executed on a general purpose processor including a simple for-loop that performs a MAC on an INPUT array and a WEIGHT array and then passes the output of the MAC to a ReLU, such as in the following logic:

Initialize a counter integer to 0.
Initialize a storing variable (e.g., MAC) to 0.
Provide an INPUT array having the length n with input values.
Provide a WEIGHT array having the length n with signed weight values.
For counter=0, counter<n, counter++{
    MAC=MAC+(INPUT[counter]*WEIGHT[counter]).
}
Output=the maximum value of (0, MAC).
Provide Output value.

For large data sets, execution on a general purpose processor is inefficient. To improve efficiency, this algorithm may be implemented in dedicated hardware, for example, in an application specific integrated circuit (ASIC) or field programmable gate array (FPGA). Implementing this logic in dedicated hardware, such as an application specific integrated circuit (ASIC), however, involves the use of binary math in digital logic blocks. A description will now be provided in a context of implementing the MAC (and the ReLU) in hardware. Implementation in hardware involves computing the MAC and implementing the ReLU in a binary format.

Figure 4:
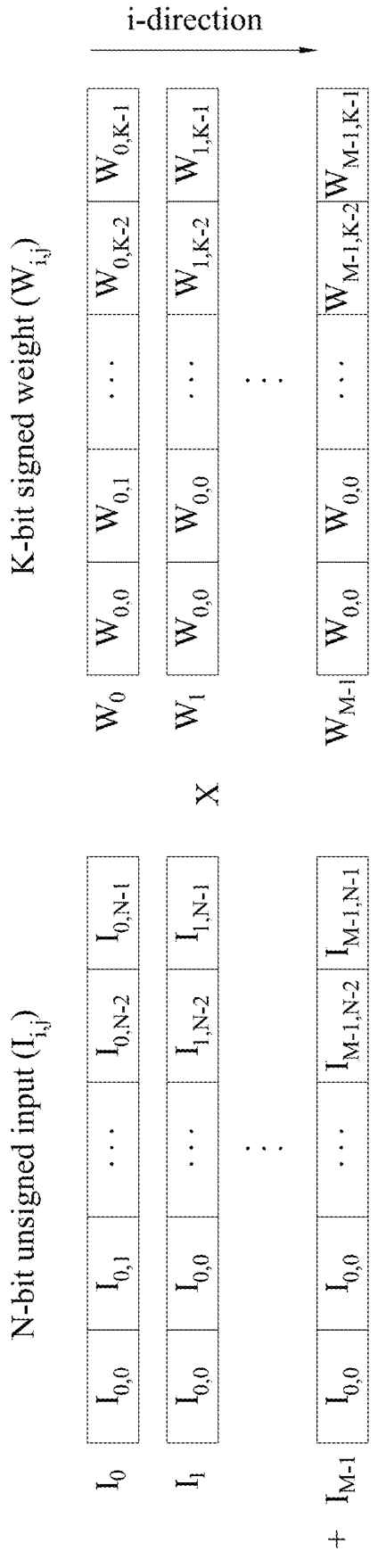
FIG. 4 illustrates a binary representation of the input data, the weighting vectors, and the MAC, for algorithmically implementing the MAC in hardware, in accordance with some embodiments.

FIG. 4 illustrates a binary representation of the input data, the weighting vectors, and the MAC, for algorithmically implementing the MAC in hardware. The hardware implementation is discussed in greater detail below in connection with a skip module. The input data is shown as a node of unsigned values, e.g., magnitudes, for data points in the node. The input data has a length of N-bits. N may be, for example, 4 bits, 8 bits, 16 bits, etc. If N is 8, for example, then each of the input values is between 0 and 255. The weighting vectors are signed weighting values in 2's complement format. As such, negative numbers will lead with a 1 in the most significant bit (MSB). The length of each of the weighting vectors are K-bits. N may be equal to K or may be a different value. If K is 8 bits, for example, then each of the weighting values may be between −128 and 127. In the notation, for the input values, the i-th input corresponds to the input index of the input data points in the node. Each of the weights will have a corresponding i-th weight index of the weighting vectors. In other words, there is a one-to-one correlation of the i-th input and the i-th weighting vector. In contrast, the j-th bit of each input or each weighting vector is from left to right, so that the MSB is the 0-th bit and the least significant bit (LSB) is the (N−1)-th bit of the input and the (K−1)-th bit of the weighting vector. Because N and K may be different values, the total number of j-th positions in the input data may be different than the j-th positions of the weighting vectors. As an example of the notation, the $I_{i,j}$ bit where i=2 and j=5 corresponds to the sixth bit of the third input data. Similarly, the $W_{i,j}$ bit where i=3 and j=4 corresponds to the fifth bit of the fourth weighting vector. As noted in FIG. 4, the total number of bits resulting from the MAC is equal to N plus K plus the logarithm (base 2) of M, rounded up to the nearest integer. For example, if the number of inputs in the node is 9 (e.g., corresponding to a 9 point convolution) and N and K are each 8, then the number of bits in the output of the MAC is 8+8+Roundup ($\log_2$ 9)=20. This value can equally be expressed as Roundup (N+K+$\log_2$ M).

Figure 5:
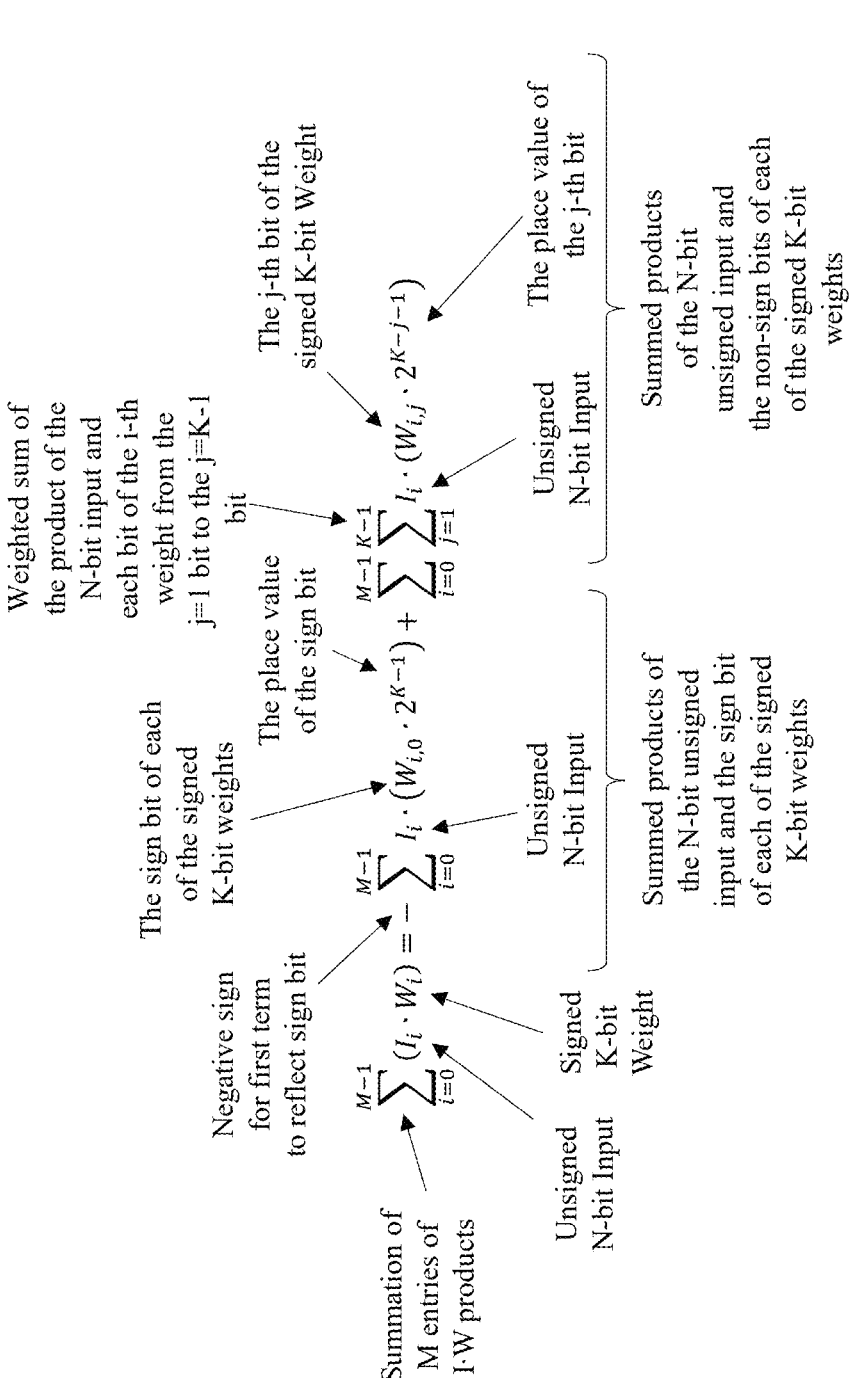
FIG. 5 illustrates a mathematical formula for processing the input values and weighting vectors in a bitwise manner, in accordance with some embodiments.

FIG. 5 illustrates a mathematical formula for processing the input values and weighting vectors in a bitwise manner. In particular, each of the input values is multiplied by each bit of the weighting vectors and summed after each iteration. On the left hand side of the equation is the general formula for the sum product of an i-number of inputs and corresponding i-number of weighting vectors. Since the math that will be performed is binary math, this can be broken down into the right hand side of the equation which includes a first term for handling the sign bits of the weight vectors and a second term for handling the remaining bits.

The first term represents the summed products of the N-bit unsigned inputs and the sign bit of each of the signed K-bit weight vectors. As noted in FIG. 4, the MSB of the weighting vectors holds the sign bit and is notated as the 0th bit of the weight vector, for bit j=0. The first term multiplies the input by the 0th bit of the weighting vector (representing the sign bit) and multiplies that result by the place value of the 0th bit, which is equal to $2^{K-1}$. This result is then recorded as a negative value. Essentially, the multiplication between the input and the sign bit establishes the maximal negativity of the weighting vectors. For example, if the weighting vector is 8-bits and is negative, the sign bit represents a '1' in the $2^7$ place value. This is equivalent to taking the 2 s complement of the input and left shifting it 7 times. This is done iteratively for each of the inputs $I_i$ and the first term represents the summed result of all of these products. When the corresponding weighting vector is not negative, then a zero would be added.

The second term includes two nested summation operations. The interior summation represents the summed total of each of the remaining j-bits in the weighting vector $W_i$ multiplied by the input $I_i$, multiplied by the place value for the corresponding j-th bit in the weighting vector $W_i$. The exterior summation repeats the interior summation for each input $I_i$ and weighting vector $W_i$ and adds all these summations together.

Figure 6:
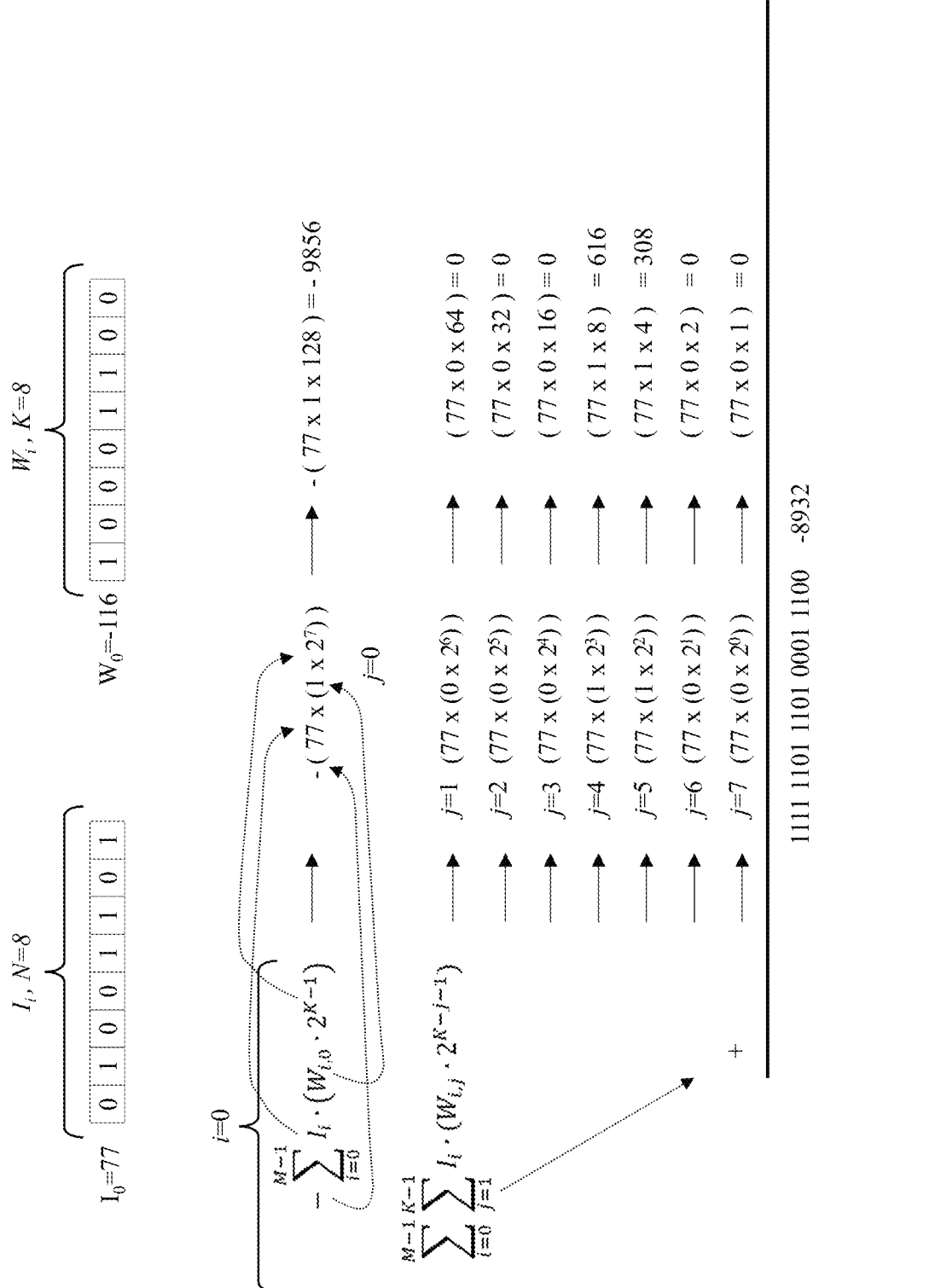
FIG. 6 illustrates a sample calculation of an input I and weighting vector W, in accordance with some embodiments.

FIG. 6 illustrates a sample calculation of an input I and weighting vector W, where M=1, N=8, and K=8. $I_0$=77 (0100 1101) and $W_0$=−116 (1000 1100). In the summation $$-\sum_{i=0}^{M-1} I_i \cdot \left(W_{i,0} \cdot 2^{K-1}\right) + \sum_{i=0}^{M-1} \sum_{j=1}^{K-1} I_i \cdot \left(W_{i,j} \cdot 2^{K-j-1}\right),$$

the first term may be reconciled as −1·(0100 1101)·(1·$2^7$)=1011 0011·$2^7$=1101 1001 1000 0000 (note that the sign bit has been padded out with an additional leading '1'). The second term may be reconciled as 77·(0·$2^6$)+77·(0·$2^5$)+77·(0·$2^4$)+77·(1·$2^3$)+77·(1·$2^2$)+77·(0·$2^1$)+77·(0·$2^0$)=77·$2^3$+77·$2^2$=616 (0010 0110 1000)+308 (0001 0011 0100)=924 (0011 1001 1100). The first term is added to the second term to result in the sum −8932 (1101 1101 0001 1100).

As can be seen in this example, when the weighting vector is negative, the bitwise math sets the weighting vector at −128 times the input and then the subsequent bits add back positive portions to the negative number (making it less negative) until the final result is reached.

Where the weighting vector is positive, the first term will result in '0' and the second term will be the bitwise summation of the remaining bits of the weighting vector, similar to that shown with respect to the negative weighting vector.

With respect to FIGS. 7 through 12, a skip evaluation and activation feature (also referred to as a skip module) is discussed which, when used with a compatible activation function (such as the ReLU activation function), simplifies the computational complexity of the MAC sum product accumulator of an input node and corresponding weighting vectors. As noted above, the ReLU activation function, for example, provides an output of MAX(0, input), where input equals the MAC product sum. The MAC product sum is determined through a series of partial accumulations as the bits of the weighting vectors are iteratively processed. As such, if the partially accumulated product sum after a particular iteration is ever such that it can never become positive (or never meet the condition of the activation function), then it may be determined that the rest of the computations may be skipped.

Where the weighting vectors W are processed iteratively bit-by-bit, after each iteration, the output of a partial product sum accumulation can be compared to a "worst case" scenario assumed for each of the remaining bits of the weighting vectors W. The "worst case" is the case which would produce the most computational cycles, i.e., not generate a skip condition. Here, the worst case is where all of the remaining bits of the weighting vectors W are presumed to be equal to 1 s. This would mean that, for example an 8-bit weighting vector $W_i$, if $W_i$ is negative (i.e., begins with $W_{i,0}=1$) the least negative number less than 0 is –1 (all is in binary). And if $W_i$ is positive (i.e., begins with $W_{i,0}=0$), the largest number is 127 (where the rest of the bits are 1 s in binary).

Figure 7:
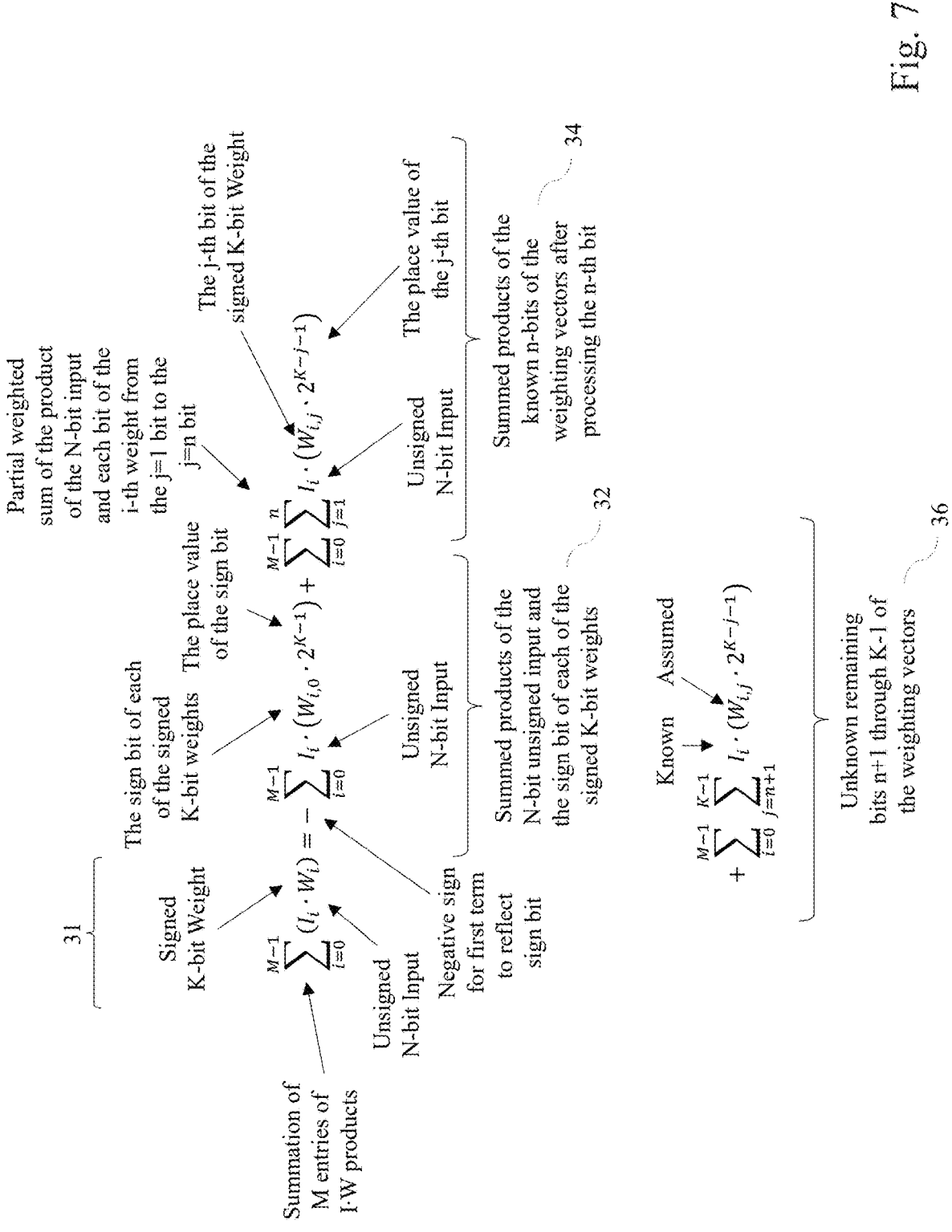
FIGS. 7 through 12 illustrate a skip evaluation and activation feature, in accordance with some embodiments.

FIG. 7 illustrates a summation formula 30 which accounts for the "unknown" parts of the weighting vectors for any given iteration n. The formula of FIG. 7 illustrates a formula which is similar to the formula in FIG. 5. It includes the general product sum accumulation formula 31 which is broken down into the sign bit summation term 32 and a nested summation for the remaining bits of the weighting vectors. The nested summation for the remaining bits is broken into a first nested sum term 34 for the first n-bits (n>0) and a second nested sum term 36 for the remaining K–1 bits of the weighting vector. For the iteration n, the first nested sum term 34 is the summed products of the known n-bits of the weighting vectors after processing the n-th bit, and the second nested sum term 36 contains the remaining bits from the weighting vectors W from the n+1 bit up to the remaining K–1 bits. As noted above, in some embodiments, the unknown weighting vector bits can be assumed to be a "worst case" where all bits are equal to 1. As the weighting vector is processed bit-by-bit from the MSB to the LSB, more of the actual weighting vector is known and the bit significance of unknown assumed weighting vector is decreased with each iteration.

FIGS. 8 through 12 illustrate the application of the skip module, in accordance with some embodiments. In particular, FIGS. 8 through 12 demonstrate how the summation formula of FIG. 7 is implemented in accordance with the flow diagram of FIG. 13 (discussed below). Each of FIGS. 8 through 12 illustrate a set of M=9 input vectors $I_i$, each with N=8 bits, and M=9 weighting vectors $W_i$, each with K=8 bits. The values for each of the input vectors were generated randomly for purposes of demonstration and are 77, 138, 179, 76, 175, 159, 153, 212, 128. The values for each of the weighting vectors were generated randomly for purposes of demonstration and are ⁻116, 76, 90, –83, 33, –8, –60, –98, –22. The binary representations for each of these numbers is also illustrated in FIGS. 8 through 12.

Figure 8:
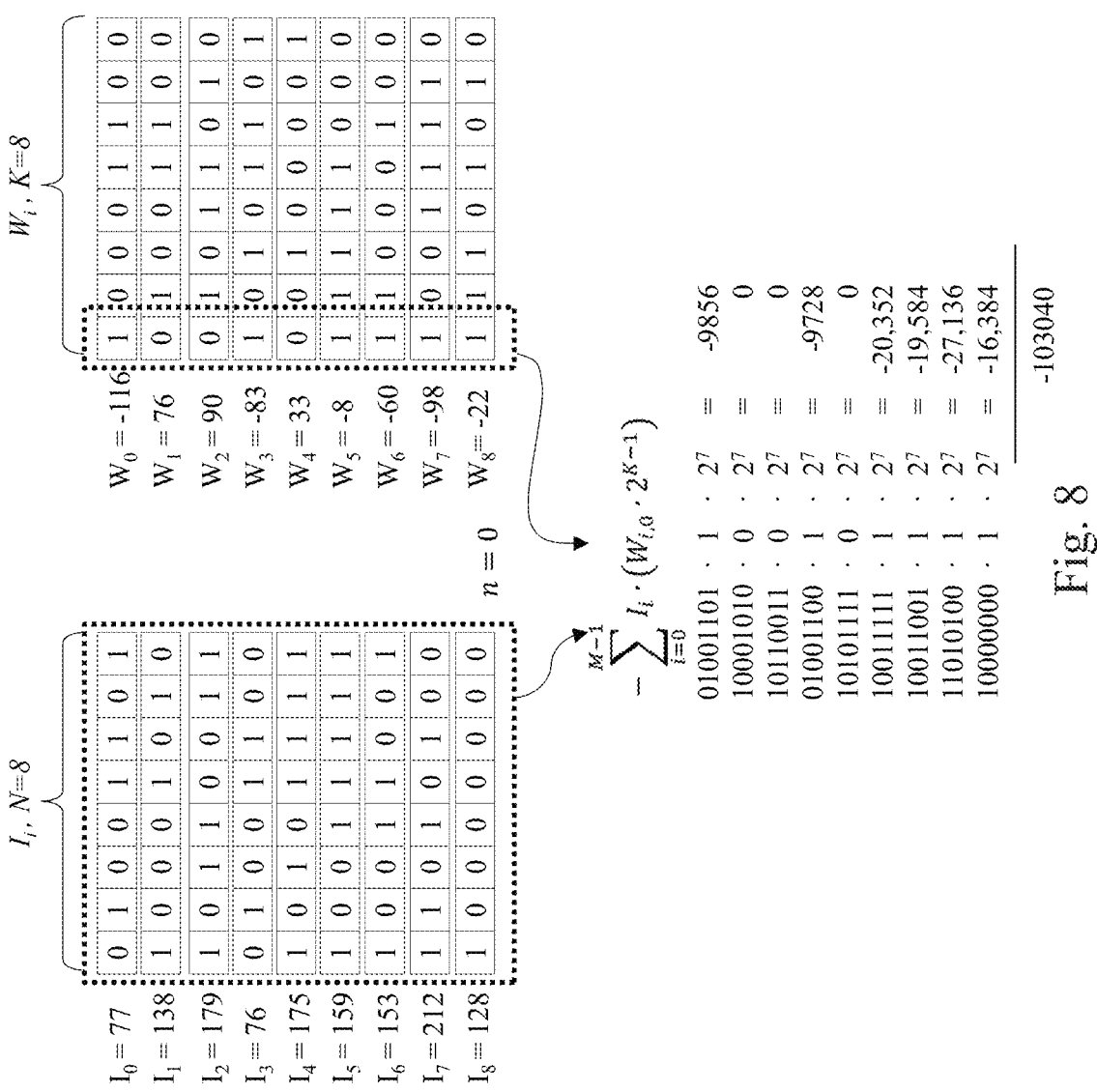
Figure 9:
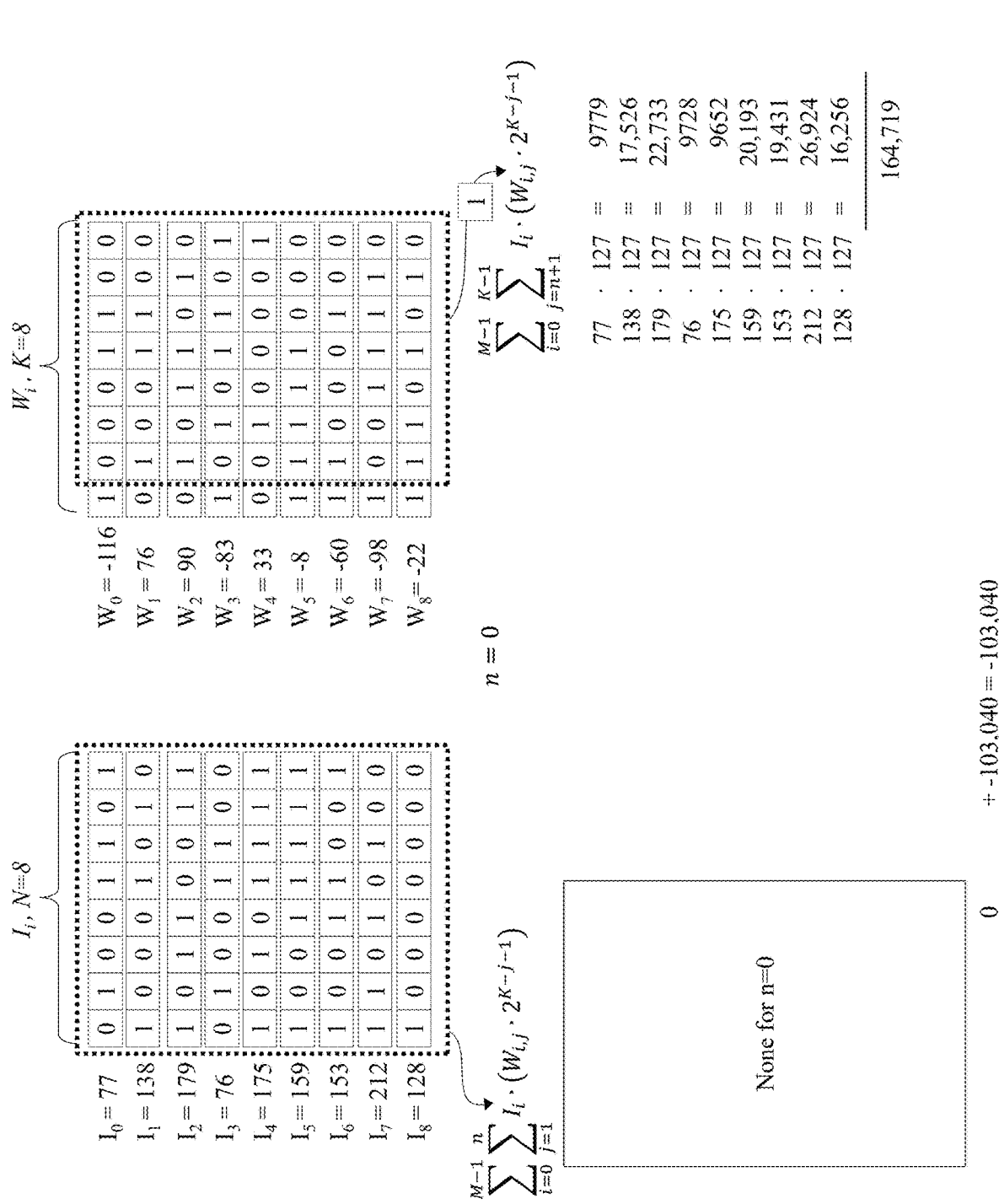

FIGS. 8 and 9 illustrate the computation of the summation formula 30 where iteration n=0. Where iteration n=0, the summation formula is reconciled at the first weight bit j=0. FIG. 8 illustrates that each of the input vectors is multiplied by the sign bits of the respective weighting vectors and further multiplied by the place value of the sign bit ($2^7$). If the weighting vector is positive, the bit value for the sign bit is '0' and a '0' will accrue. If the weighting vector is negative, the bit value for the sign bit is '1', and the accrued value will be equivalent to the negative of the input vector multiplied by $2^7$. These products are summed. As illustrated in FIG. 8, the sum of these products is –103,040. This value is the most negative accumulated value possible. If all of the other bits of the weighting vectors are '0', then the output value would be –103,040. If any remaining bit of the weighting vectors is '1' that value would cause the accumulated value to become less negative. Thus, every other operation would either have no effect or only positive effect on the accumulated value.

FIG. 9 illustrates the handling of the remaining two terms. The first nested sum term 34 (see FIG. 7) would have no operation accruing to it, since the sum begins where j=1. In this case, where n=1, j=0 so no value would result from the first term. The second nested sum term 36 is assumed to be the "worst case," which as explained above is the case which would cause the most computational cycles. Here the most computational cycles would result if the final accumulated sum is greater than 0. As such, the worst case can be taken where every bit of the remaining weighting vectors is assumed to be '1'. This value is 127 in decimal and so each of the input values is multiplied by the value 127 for each of the respective assumed weighting vectors and then added together to result in the number 164,719. If this worst case sum is compared to the accumulated value –103,040, one can see that the final value could be as high as –103,040+ 164,719=61,679. Since this value is non-negative, i.e., results in a non-zero value after the activation function, then more bits are needed to be processed.

Figure 10:
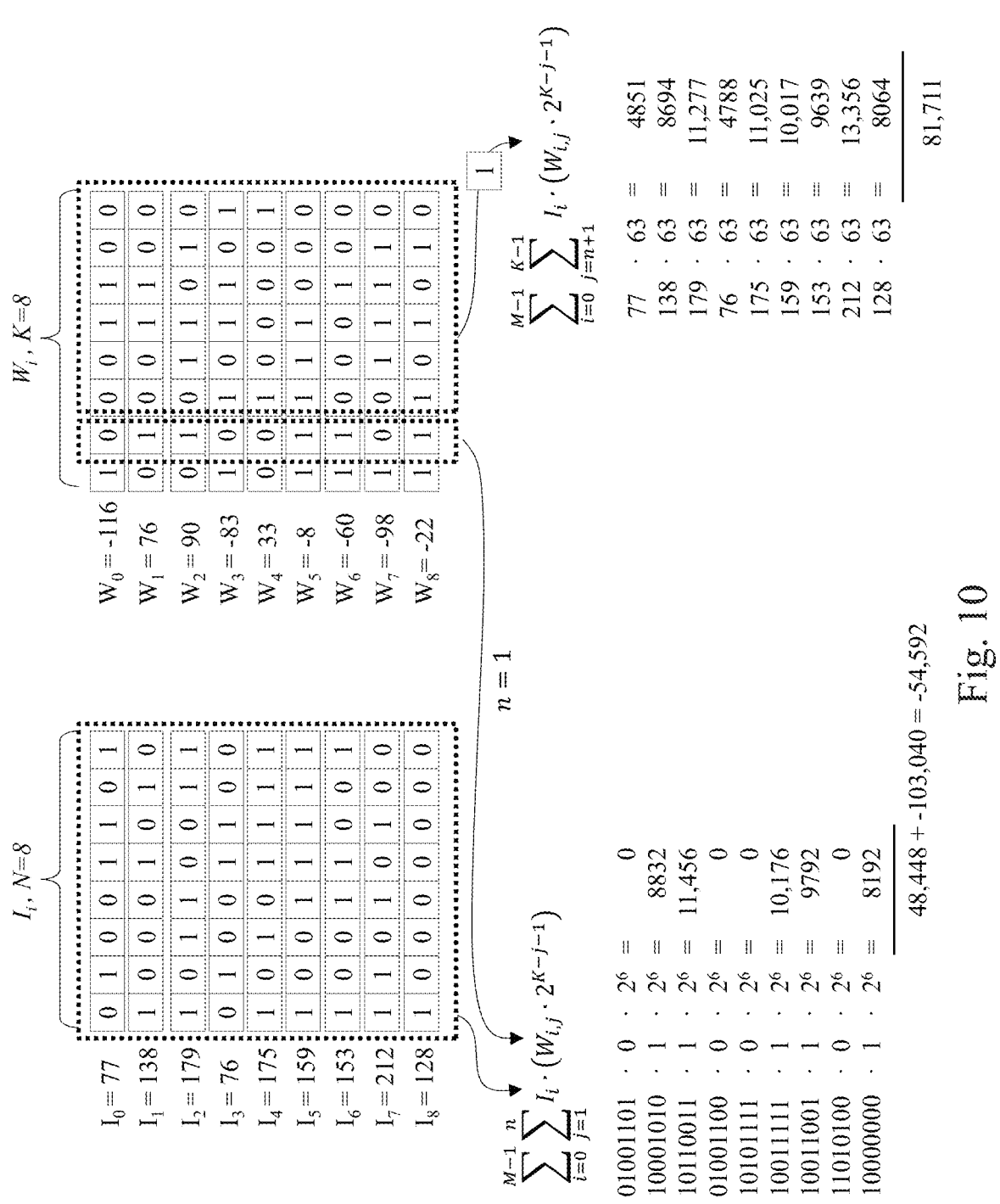

FIG. 10 illustrates the summation where n=1, i.e., where j=0,1. Where j=0 has already been calculated to be –103, 040. Where j=1, in the first nested sum term 34 (see FIG. 7), each of the input vectors h is multiplied by the j=1-bit in corresponding weighting vectors (i.e., $W_{i,1}$) and that value is multiplied by the place value of the 1-bit ($2^{K-j-1} = 2^{8-1-1} = 2^6$). So where $W_{i,1}=0$, the accrued value will be 0, and where $W_{i,1}=1$, the accrued value will be the respective input multiplied by $2^6$. These are calculated and then summed according to the outer summation of the first nested sum term 34. In this example, the sum equals 48,448. When this value is added to the j=0 value, the total is –54,592.

The second nested sum term 36 of FIG. 10 is assumed to be the "worst case," which as explained above is the case which would cause the most computational cycles, i.e., where each remaining unknown bit of the weighting vectors is assumed to be a '1'. Where n=1, this value is 63 in decimal and so each of the input values is multiplied by the value 63 for each of the respective assumed weighting vectors and then added together to result in the number 81,711. If this worst case sum is compared to the accumulated value –54,592, one can see that the final value could be as high as –54,592+81,711=27,119. Since this value is non-negative, i.e., results in a non-zero value after the activation function, then more bits are needed to be processed. It is noted that because the second bit (j=1) of the weighting vectors was not actually the worst case, the difference after processing the second bit between the accumulated value and the worst case value −27,119—is less positive than the difference after processing only the first bit above −61,679.

Figure 11:
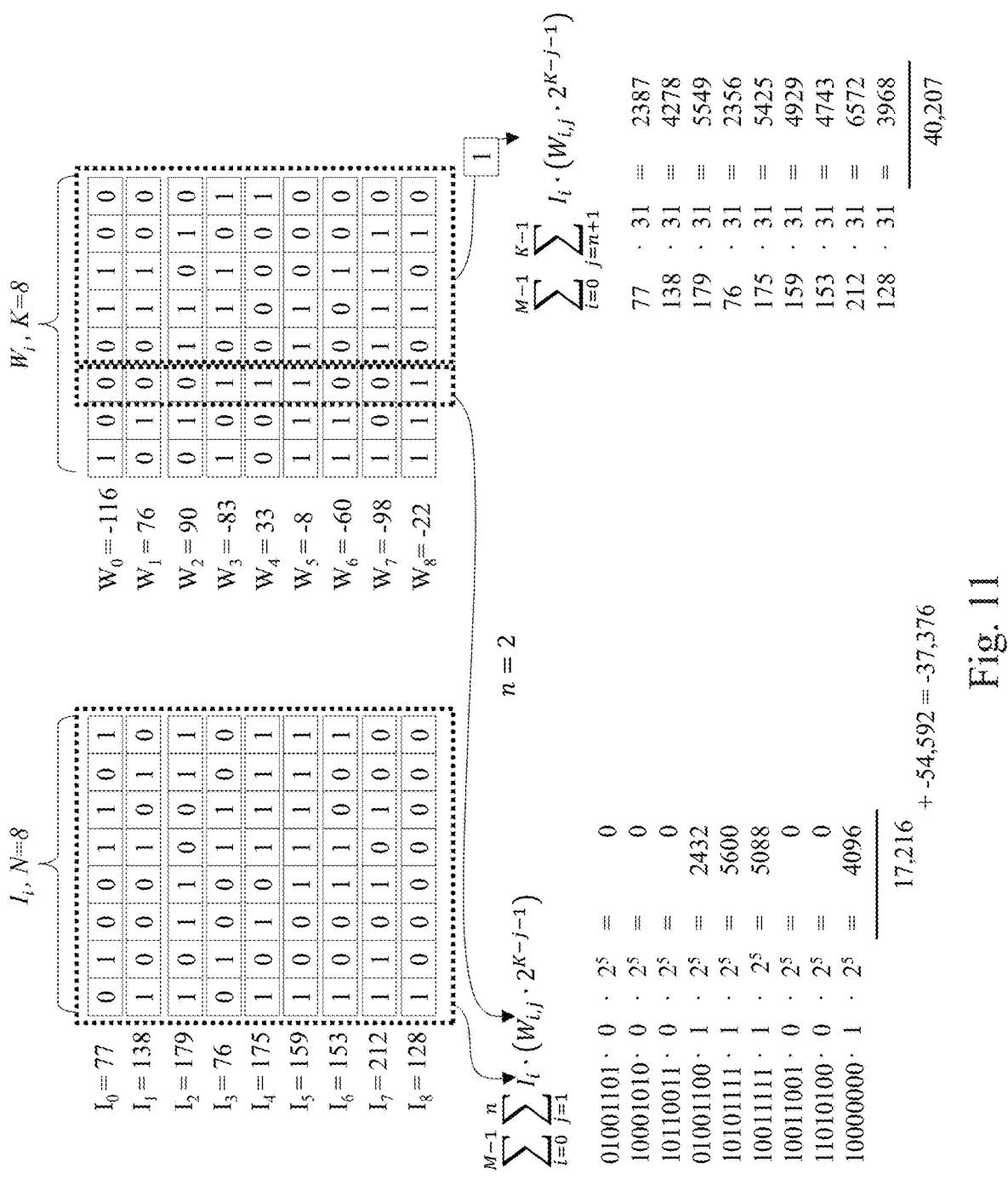

FIG. 11 illustrates the summation where n=2, i.e., where j=0,1,2. Where j=0,1 has already been calculated to be −54,592. Where j=2, in the first nested sum term 34 (see FIG. 7), each of the input vectors $I_i$ is multiplied by the j=2-bit in corresponding weighting vectors (i.e., $W_{i,2}$) and that value is multiplied by the place value of the 2-bit ($2^{K-j-1}$->$2^{8-2-1}$->$2^5$). So where $W_{i,2}$=0, the accrued value will be 0, and where $W_{i,2}$=1, the accrued value will be the respective input multiplied by $2^5$. These are calculated and then summed according to the outer summation of the first nested sum term 34. In this example, the sum equals 17,216. When this value is added to the j=0,1 value, the total is −37,376.

The second nested sum term 36 of FIG. 11 is assumed to be the "worst case," which as explained above is the case which would cause the most computational cycles, i.e., where each remaining unknown bit of the weighting vectors is assumed to be a '1'. Where n=2, this value is 31 in decimal and so each of the input values is multiplied by the value 31 for each of the respective assumed weighting vectors and then added together to result in the number 40,207. If this worst case sum is compared to the accumulated value −37,376, one can see that the final value could be as high as −37,376+40,207=2,831. Since this value is non-negative, i.e., results in a non-zero value after the activation function, then more bits are needed to be processed.

Figure 12:
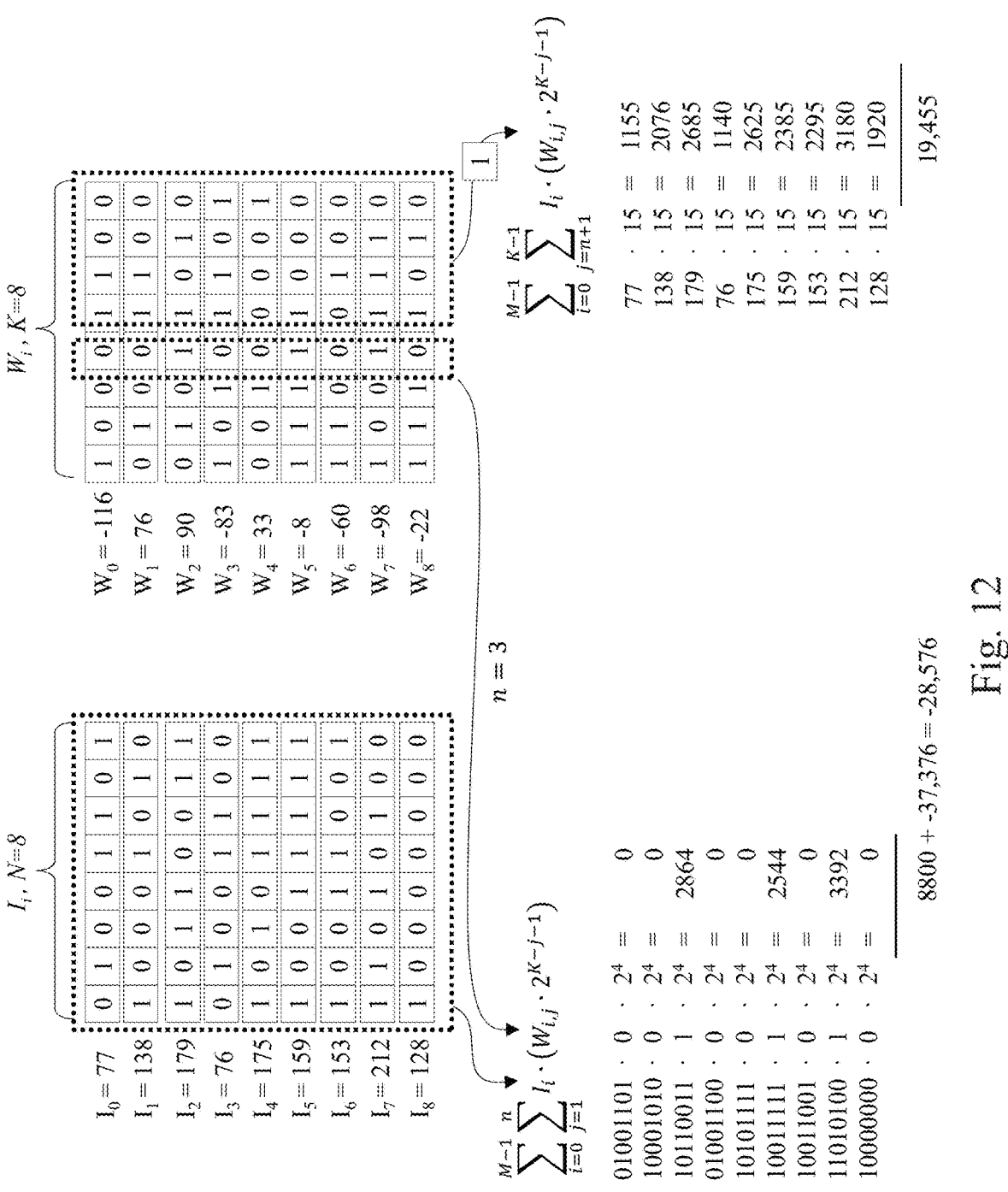

FIG. 12 illustrates the summation where n=3, i.e., where j=0, 1, 2, 3. Where j=0, 1, 2 has already been calculated to be −37,376. Where j=3, in the first nested sum term 34 (see FIG. 7), each of the input vectors $I_i$ is multiplied by the j=3-bit in corresponding weighting vectors (i.e., $W_{i,3}$) and that value is multiplied by the place value of the 3-bit ($2^{K-j-1}$->$2^{8-3-1}$->$2^4$). So where $W_{i,3}$=0, the accrued value will be 0, and where $W_{i,3}$=1, the accrued value will be the respective input multiplied by $2^4$. These are calculated and then summed according to the outer summation of the first nested sum term 34. In this example, the sum equals 8,800. When this value is added to the j=0,1,2 value, the total is −28,576.

The second nested sum term 36 of FIG. 12 is assumed to be the "worst case," which as explained above is the case which would cause the most computational cycles, i.e., where each remaining unknown bit of the weighting vectors is assumed to be a '1'. Where n=3, this value is 15 in decimal and so each of the input values is multiplied by the value 15 for each of the respective assumed weighting vectors and then added together to result in the number 19,455. If this worst case sum is compared to the accumulated value −28,576, one can see that the final value could be as high as −28,576+19,455=−9121. Since this value is negative for the "worst case" scenario, then it can be determined that no remaining values for the weighting vector could possible result in a non-negative value. In other words, there is no value for the remaining bits of the weighting vector where n=4, 5, 6, 7 that would result in a non-negative product sum accumulation. Since the accumulation value would always be negative for any remaining unprocessed bits of the weighting vectors, when passed to the ReLU activation function, the result would always be 0. Thus, processing any further bits would be a waste of resources. In such a situation, the skip module may activate a skip signal and the next input block would be processed.

FIG. 13 illustrates a process flow diagram 100 for the skip evaluation and activation feature. At 110, a partial sum accumulation is performed in a wordwise-input and bitwise-weight manner as part of a MAC sum product accumulation. Such a manner is as described above, where an entire unsigned input value (of any bit length) is multiplied in a bit-wise manner by a signed weight vector. The partial sum accumulation aspect reflects the iterative process where the weight vector is processed bit-by-bit. Thus, at 110, one bit of the weighting vector is processed. At 120, the partially accumulated product sum is evaluated for a skip condition. The skip condition may be based on a corresponding activation function. For example, in some embodiments, the activation function may be the ReLU activation function, so that if the output of the MAC sum product accumulation is negative, then the output of the activation function is zero. Thus, the skip condition may evaluate the partial accumulated product sum to predict whether the MAC sum product is likely to be positive or negative. In some embodiments, the skip condition may be based on a predefined threshold (see, e.g., FIGS. 23A and 23B and their accompanying description). In other embodiments, the skip condition may be dynamically calculated based on a prediction of the remaining unprocessed weighting bits.

At 130, if the partially accumulated product sum is determined to meet the skip condition, then at 140, a signal is asserted to indicate that the subsequent operations may be skipped. The subsequent operations may include, for example, memory access read operations (e.g., loading input or weight values, etc.) or computation operations (e.g., subsequent iterations). If at 130, the partially accumulated product sum is determined not to meet the skip condition, then at 150 it will be determined whether all of the weight bits have been processed. If all of the weight bits have been processed, then the process has finished and the partial accumulated product sum has accumulated to become the MAC sum product output at 160. After the output is determined at 160, the activation function will be applied to the output, at 170. If, at 150, all of the weight bits have not been processed, then at 180 the next weight bit will be advanced and the process will repeat at 110. It should be noted that after 140, if the skip condition is met and the signal is asserted to skip the subsequent operations, then the output may optionally be taken as the accumulated product sum, and the activation function at 170 may be performed on the output.

Figure 14:
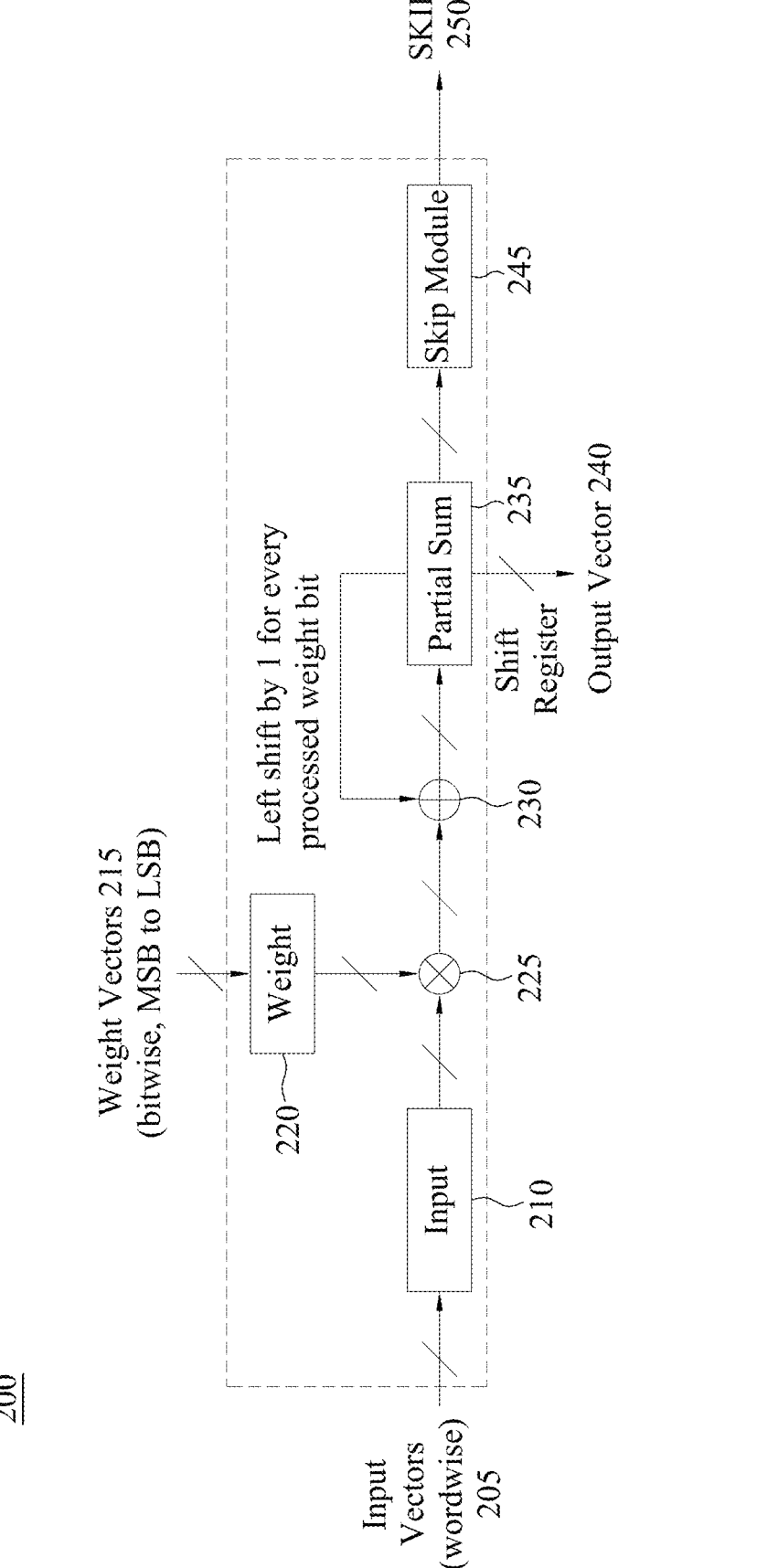
FIGS. 14 through 17 illustrate various views of circuit block diagrams of a MAC skip circuit, in accordance with some embodiments.

FIG. 14 illustrates a high-level circuit block diagram of a hardware implementation of the MAC skip circuit 200. In some embodiments, the MAC skip circuit 200 may be implemented on a single semiconductor substrate. In other embodiments, the MAC skip circuit 200 may be implemented on multiple semiconductor substrates and interconnected as needed. An input block 210 takes the input values from the unsigned input vectors 205. A weight block 220 takes its input from the signed weight vectors 215. The input vectors 205 are multiplied by multiplier 225 with the next bit of the weight vectors 215. If the next bit is the first bit, the result is transformed into 2s complement format and added by add block 230 to the left shifted value of the partial sum stored in shift register 235 (which would have been initialized to 'o') and then stored as the new partial sum in shift register 235, otherwise, the result is added by add block 230 to the left-shifted value of the partial sum in shift register 235. If all of the bits of the weight vectors 215 are processed then the partial sum stored in shift register 235 is taken as the output 240. Otherwise, after each iteration, the partial sum stored in shift register 235 is evaluated by the skip module 245 to determine whether a skip condition exists. If so, then a skip signal is asserted. If not, then the process is repeated again for each bit of the K-bits of the weight vectors until the skip signal is asserted or until the remainder of the K-bits is processed. If the skip signal is asserted, then the partial sum stored in shift register 235 may be taken as the output 240, may be modified and taken as the output 240, or a zero may be taken as the output 240.

Figure 15:
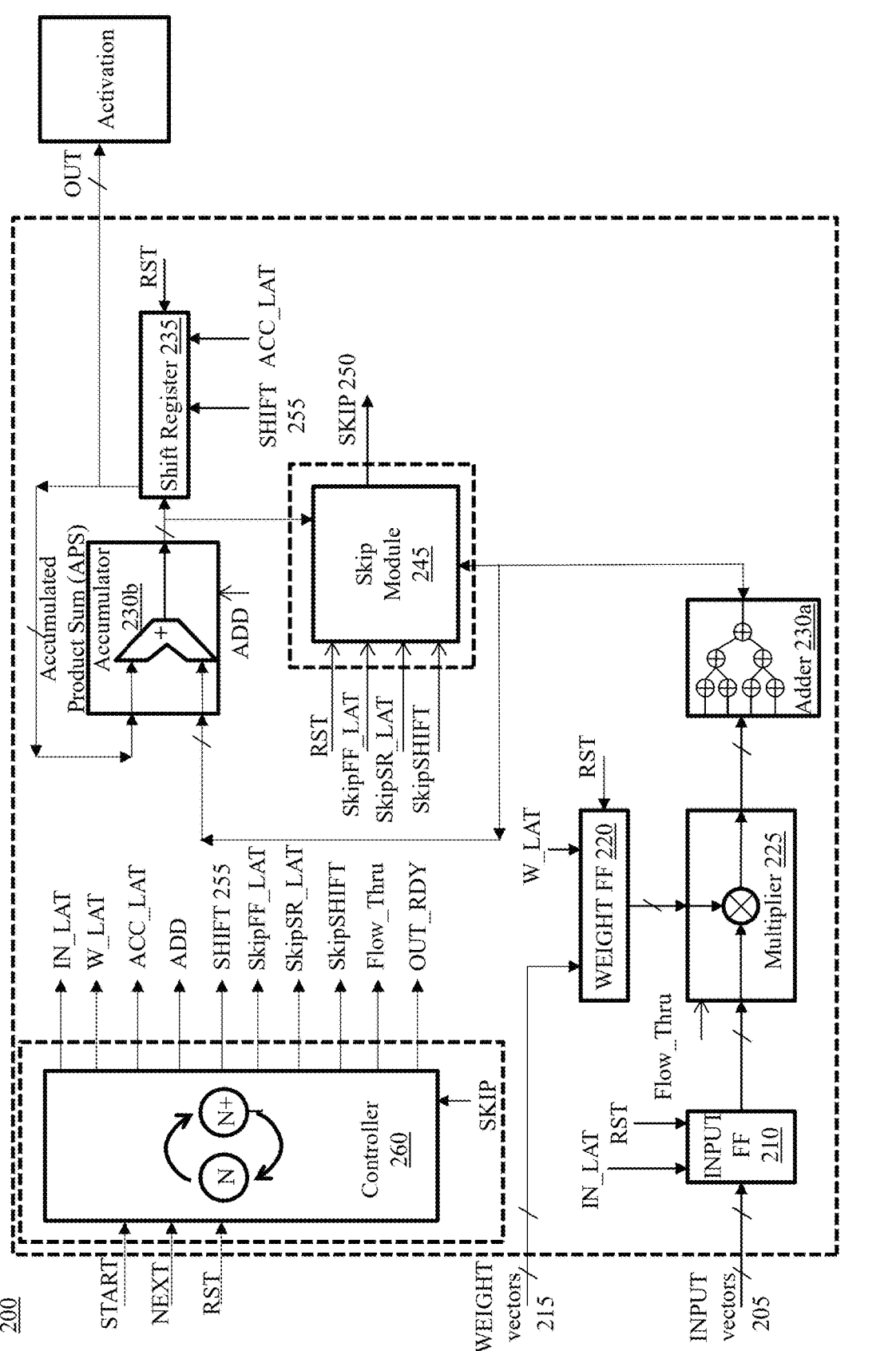

FIG. 15 illustrates a more detailed block diagram of the MAC skip circuit 200, in accordance with some embodiments. Like references are used to refer to like elements as the MAC skip circuit 200 discussed above with respect to FIG. 14. It should be understood that pins having the same labels are all coupled together (e.g., an output pin labeled 'x' would be coupled to an input pin labeled 'x'). The input vectors 205 include a set of M N-bit vectors. The slash in the arrow line leading from the INPUT vectors 205 to the INPUT Flip Flop (FF) 210 indicates that one line is used to illustrate multiple lines. In some embodiments, there may be M lines leading into the INPUT FF 210, one line for each of the input vectors 205. In some embodiments there may be N lines for each one of the M vectors, or N×M lines leading into the INPUT FF 210. In such embodiments, each bit of the M vectors may be processed in parallel. The input vectors 205 may be latched one-bit at a time or may be latched in a word-wise manner, for example, 8-bits at a time.

The INPUT FF 210 is a flip flop circuit block used to latch the input vectors 205 into the MAC skip circuit 200. The IN_LAT pin provides a latch signal input for the INPUT FF 210 which, when activated, causes the INPUT FF 210 to latch the INPUT vectors 205 into the INPUT FF 210. The RST pin is a reset signal input for the INPUT FF 210 to accommodate a universal reset signal which may be provided to the various blocks which can cause the state of the MAC skip circuit 200 (including the INPUT FF 210) to return to an initial/reset state. In some embodiments, the INPUT FF 210 includes enough flip flop states to accommodate each bit of each input vectors 205, i.e. M×N flip flop states. The flip flops may be arranged in a series of registers, for example, one N-bit register for each M input vector 205.

The WEIGHT FF 220 is a flip flop circuit block used to latch the weight vectors 215 into the MAC skip circuit 200. The W_LAT pin provides a latch signal input for the WEIGHT FF 220 which, when activated, causes the WEIGHT FF 220 to latch the weight vectors 215 into the WEIGHT FF 220. The RST pin is a reset signal input for the WEIGHT FF 220 to accommodate a universal reset signal which may be provided to the various blocks which can cause the state of the MAC skip circuit 200 (including the WEIGHT FF 220) to return to an initial/reset state. In some embodiments, the WEIGHT FF 220 latches all of the weight vectors 215 and has enough flip flop states to accommodate M K-bit weight vectors 215, i.e., M×K flip flop states. In other embodiments, the WEIGHT FF 220 only latches one bit at a time from each of the weight vectors 215, starting with the MSB, i.e., K flip flop states. The output of the WEIGHT FF 220 may include parallel outputs of each weight bit for the same place value for each of the weight vectors 215.

The Multiplier 225 is a multiplier circuit block used to multiply each of the INPUT vectors 205 latched in the INPUT FF 210 with each respective weight vector 215 latched in the WEIGHT FF 220 in a bitwise manner. In other words, only one bit from each of the weight vectors 215 is multiplied at a time against a respective input vector 205.

The Multiplier 225 also includes a Flow_Thru pin, which when activated causes the multiplier 225 to pass the input vectors 205 through regardless of the bit values from the WEIGHT FF 220.

The add block 230 of FIG. 14 is broken down into Adder 230a and Accumulator 230b. The Adder 230a is an adder circuit block used to add each of the bit-weighted input vectors 205 together. As illustrated an adder tree circuit block is used, however, other types of adders may be used. The adder strategy keeps the carried bits. The number of output bits from the Adder 230a is related to the number of bits of each of the input vectors (N) and the number of input vectors (M). The Adder will output N+Roundup($\log_2$ M) bits. So for an example convolution of 9 8-bit input vectors, the adder will output 8+4=12 bits. The output pins of the Adder 230a are coupled to input pins for an Accumulator 230b.

The Accumulator 230b is essentially a 2×1 adder circuit block which adds the incoming sum product to a bit shifted previous sum product, which is fed back to the Accumulator 230b to another input pin of the Accumulator 230b. The Accumulator 230b includes an ADD pin, which when activated instructs the Accumulator 230b to add the two inputs together rather than subtract the two inputs. The output of the Accumulator 230b is provided to an input pin of a shift register 235 and to an input pin of a skip module 245.

The shift register 235 includes a number of flip flops arranged in a register with shift capabilities. The shift register 235 includes SHIFT input pin 255, which when activated causes the shift register 235 to left shift the contents of the shift register 235. The shift register 235 also includes an ACC_LAT pin to provide a latch signal input to latch the output of the Accumulator 230b into the shift register 235. The RST pin is a reset signal input for the shift register 235 to accommodate a universal reset signal which may be provided to the various blocks which can cause the state of the MAC skip circuit 200 (including the shift register 235) to return to an initial/reset state.

The skip module 245 is a circuit block which determines whether a skip condition occurs. Details for the skip module are discussed in further detail below with respect to FIG. 17. The skip module 245 includes an input pin to receive the output of the accumulator 230b and an output pin 250 (SKIP pin 250) which can provide a skip signal to the Controller 260. The RST pin is a reset signal input for the skip module 245 to accommodate a universal reset signal which may be provided to the various blocks which can cause the state of the MAC skip circuit 200 (including the skip module 245) to return to an initial/reset state.

The Controller 260 is a circuit block which contains a state machine and drives the necessary signals to control the interaction between the various circuit blocks of FIG. 15 described above. The Controller 260 is discussed next in greater detail.

Figure 16:
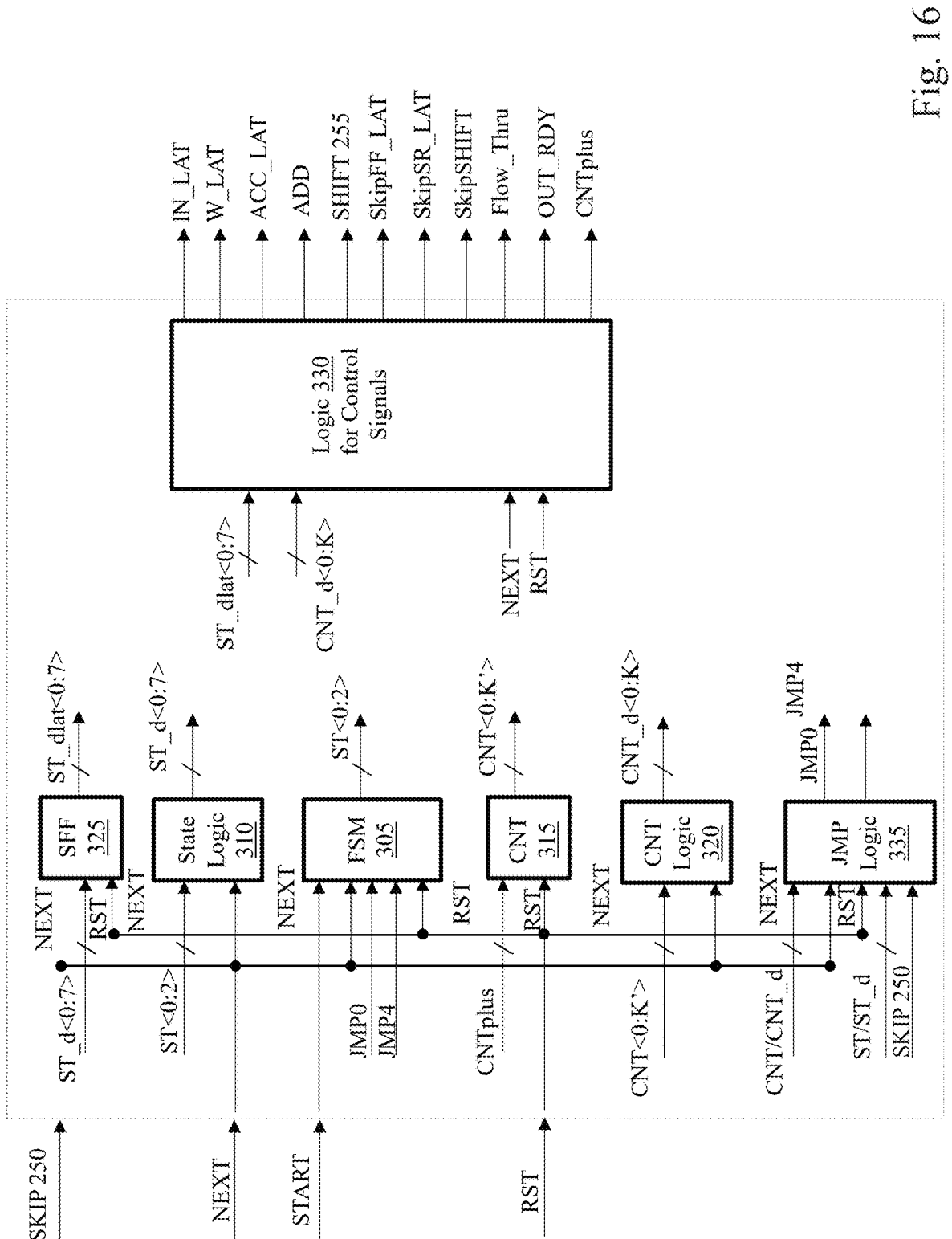

FIG. 16 illustrates a block diagram of the controller 260 circuit block. The controller 260 includes several sub-circuit blocks, including a finite state machine (FSM) 305 circuit block, a state logic 310 circuit block, a counter (CNT) 315 circuit block, a counter logic (CNT logic) 320 circuit block, a decoded state flip flop (SFF) 325 circuit block, a logic 330 circuit block for control signals, and a jump (JMP) logic 335 circuit block. The controller 260 has pins for receiving a SKIP 250 signal input, a START signal input, a NEXT signal input, and a RST signal input, each one received on a pin of the same name. The controller 260 has pins for providing control signals including the IN_LAT signal, the W_LAT signal, the ACC_LAT signal, the ADD signal, the SHIFT 255 signal, the SKIPFF_LAT signal, the SKIPSR_LAT signal, the SkipSHIFT signal, the Flow_Thru signal, and the OUT_RDY signal, each one provided on a pin of the same name. These control signals are provided by the logic 330 for the control signals.

The SKIP 250 pin receives a signal from the skip module 245, discussed in further detail below. The NEXT pin receives a signal to indicate whether the controller 260 should proceed to the next state in the state machine. The signal received by the NEXT pin may toggle to indicate the state machine should proceed to the next step. The signal received by the NEXT pin may come from outside the system and helps to control the system. The START pin receives a signal to indicate that the state machine should move from the first state to the second state. Logic can combine the START pin signal with the NEXT toggle so that when START=1 and NEXT toggles, the state machine is advance to the next state. The signal received by the START pin may come from outside the system and helps to control the system. The RST pin receives a signal to indicate whether the controller 260 should reset all latches and states back to the initial condition. The signal received by the RST pin may come from outside the system and helps to control the system.

The IN_LAT pin, the W_LAT pin, the ACC_LAT pin, the ADD pin, the SHIFT 255 pin, the SKIPFF_LAT pin, the SKIPSR_LAT pin, the SkipSHIFT pin, and the Flow_Thru pin are discussed above with respect to their corresponding pins for the various circuit blocks discussed above. The OUT_RDY pin provides a signal, which when activated indicates that the output of the MAC skip circuit 200 is ready to be taken by or provided to, for example, a circuit implementing an activation function, such as the ReLU activation function.

The FSM 305 is a circuit block which determines the current state and next state, the current state being output on the ST pins which, in the current embodiment may include three pins <0:2>, representing one of eight possible states according to the state diagram described below with respect to FIGS. 24A and 24B. The next state is generated and placed on the ST pins based on the current state, a value at the START pin, a value at the RST pin, a value at the JMP0 pin, a value at the JMP1 pin, and the toggling of the value at the NEXT pin.

The ST pins are coupled to pins of the same name at the state logic 310 circuit block. The state logic 310 block uses the ST pins and the NEXT pin to determine a decoded output placed on the pins ST_d using one hot fashion, which include 8 pins. The one hot fashion decoding translates each of the eight possible states into an output condition where only one of the output pins is high at a time, while the other remain low, so that one pin is effectively assigned to each possible state. The NEXT pin, when activated, signals the state logic 310 to look for a new input.

A counter (CNT) 315 circuit block is a circuit block which generates a counter which is used to keep track of the bit position of the weight vectors for processing the weight values in a bit-wise manner. The CNT pins of the CNT 315 include <0:K'> pins, where K' equals Roundup(log$_2$ K). The values present at the output of the CNT 315 block change based on a CNTplus pin. When the CNTplus pin is activated, the CNT pins will change so as to output a value which equals one more than the previous output. The RST pin is a pin, which when activated resets the CNT 315 so that the value of the CNT pins reconcile as zero.

The CNT logic 320 circuit block is a circuit block which is similar to the state logic 310 circuit block. The CNT logic 320 circuit block has pins which are coupled to the pins of the same name of the CNT 315 circuit block and provides a decoded output in one hot fashion on the pins CNT_d. The number of pins for the CNT_d is <0:K>, where K is as described above—the number of bits in the weight vectors 215. The NEXT pin, when activated, signals the CNT logic 320 to look for a new input on the CNT.

The state flip flop (SFF) 325 circuit block is a circuit block containing flip flops for storing each value present on the decoded state pins from the state logic 310 circuit block. The SFF 325, for example, may contain a D-type flip flop for each of the decoded state pins. Other flip flop types may be used as instead. The ST_dlat pins may transmit latch signals to the logic 330 for the control signals.

The logic 330 for the control signals circuit block is a circuit block with pins for ST_dlat, pins for CNT_d, a pin for NEXT, a pin for RST, a pin for CNTplus, and pins for IN_LAT, W_LAT, ACC_LAT, ADD, SHIFT 255, SkipF-F_LAT, SkipR_LAT, SkipSHIFT, Flow_Thru, and OUT_RDY. Signals for these pins of the same names are generated using logic gates according to the state diagram and state tables described below.

The jump (JMP) logic 335 circuit block is a circuit block which has pins coupled to the CNT or CNT_d pins, pins coupled to the ST or ST_d pins, a pin coupled to the RST pins, a pin coupled to the NEXT pins, and a pin coupled to the SKIP 250 pin. The JMP logic 335 also has a JMP0 pin coupled to the JMP0 pin of the FSM 305 and a JMP4 pin coupled to the JMP4 pin of the FSM 305. The JMP logic 335 uses logic which activates the JMP0 pin when either one of two conditions is true. Either first, when RST=0 AND NEXT toggles AND CNT=1 or second, when SKIP=1. The JMP logic 335 uses logic which activates the JMP4 pin when RST=0 AND NEXT toggles AND CNT!=7. Optionally, the activation of the JMP0 or JMP4 pins may be limited to the condition where the current state is 7. This either can be taken from the ST or ST_d pins or from the particular ST_d pin which is hot pin decoded, e.g., the ST_d<7> pin. It should be understood that the JMP logic 335 circuit block is just one way of implementing this logic. This logic can also be integrated in to the logic 330 or into the finite state machine as additional states.

Figure 17:
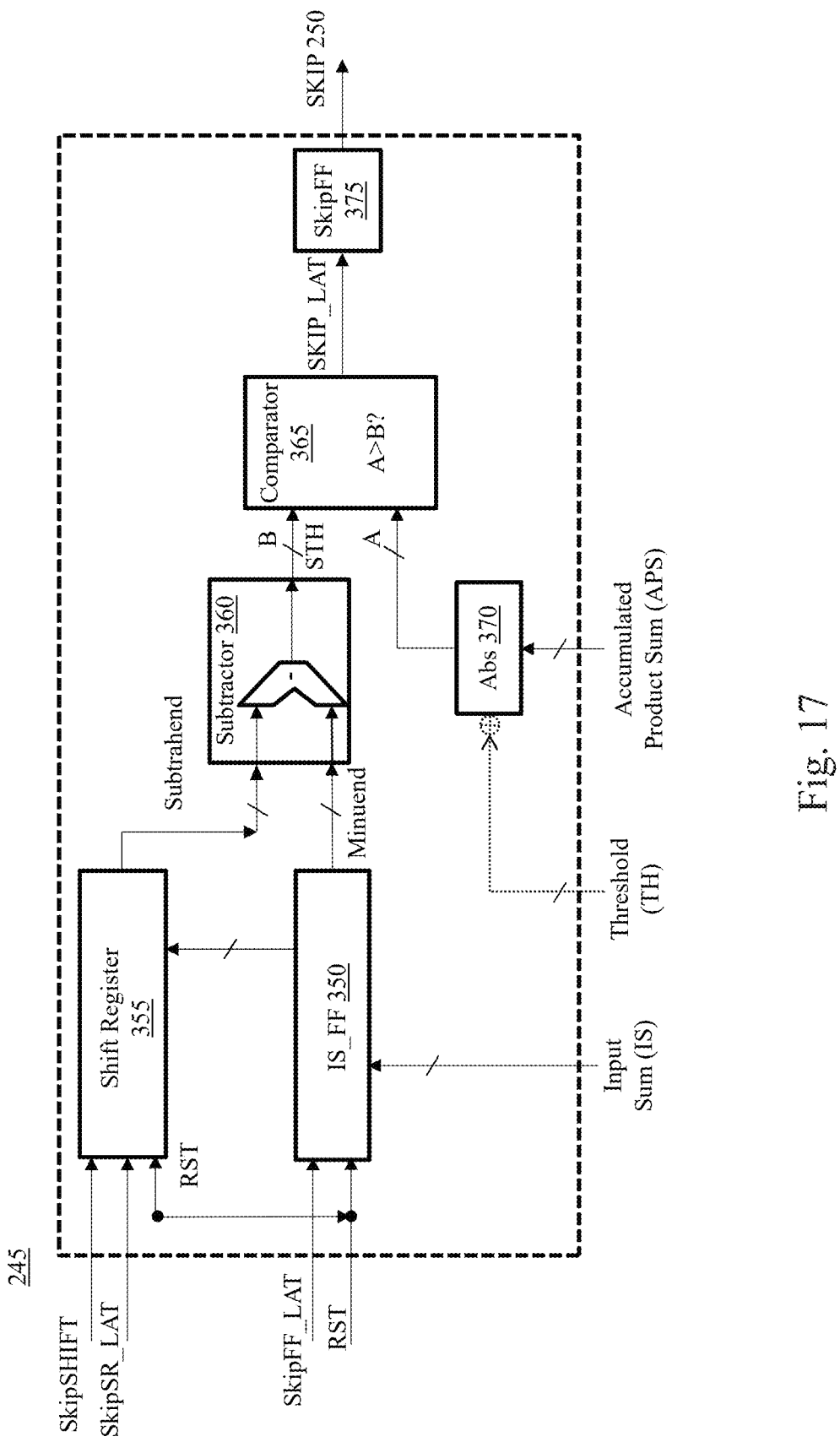

FIG. 17 illustrates a block diagram of the skip module 245 circuit block, in accordance with some embodiments. The skip module 245 circuit block can be implemented using other logic/circuit blocks according to the mathematical formula of FIG. 7, the examples of FIGS. 8 through 12, or the flow diagram of FIG. 13. The skip module 245 includes several sub-circuit blocks, including an input sum flip flop (IS_FF) 350, Shift Register 355, subtractor 360, comparator 365, absolute value (Abs) circuit block 370 and skip flip flop (SkipFF) 375 circuit block. The skip module 245 includes a SkipSHIFT pin, a SkipSR_LAT pin, a SkipFF_LAT pin, a RST pin, an Input Sum pin set, an accumulated product sum pin set, and a SKIP 250 pin. These pins provide or receive signals of the same names and couple to the pins of the MAC skip circuit 200 of the same name as described above.

The IS_FF 350 circuit block is a circuit block which may utilize flip flops to store the input sum from the IS pins. The SkipFF_LAT pin may provide a signal to latch the input sum into the IS_FF 350. The RST pin may provide a signal to reset the IS_FF 350 to an initialized state. The number of bits of the IS_FF 350 may be equal to the number of bits N of the INPUT vectors 205 plus the logarithm (base 2) of the number M of input vectors (RoundUP(log$_2$ M)). Output pins of the IS_FF 350 may be coupled to the Shift Register 355 and to the subtractor 360 as the subtrahend.

The Shift Register 355 circuit block is a circuit block which utilizes a register capable of performing a left shift. The SkipSHIFT pin, when activated, triggers a left shift. The SkipSR_LAT pin, when activated causes the Input Sum (IS) from the IS_FF 350 to be latched into the Shift Register 355. The RST pin may provide a signal to reset the Shift Register 355 to an initialized state. The number of bits of Shift Register 355 may be equal to the number of bits N of the INPUT vectors 205 plus the number of bits K of the Weight vectors 215 plus the logarithm (base 2) of the number M of input vectors (RoundUP($\log_2$ M)). Output pins of the Shift Register 355 may be coupled to the subtractor 360 as the minuend.

The subtractor 360 takes the value of the IS_FF 350 and subtracts it from the value of the Shift Register 355 to calculate an output B. The subtractor 360 provides the output B via output pins to the comparator 365.

The absolute value (Abs) circuit block 370 is a circuit block configured to take the accumulated product sum (APS) and calculate the absolute value and provide it as an output A to the comparator 365. The Abs circuit block 370 includes corresponding pins for these functions. The Abs circuit block 370 may optionally be configured to take a threshold TH value via a set of TH pins which may be added to the absolute value of the APS as a threshold offset to increase or decrease the likelihood that a skip condition will be found. In such embodiments, the Abs circuit block 370 may include an adder to add or subtract the threshold TH from the output A prior to providing the output A to the comparator 365. The threshold TH is discussed in greater detail below with respect to FIGS. 23A and 23B.

The comparator 365 circuit block is a circuit block that compares the output A with the output B. If the output A is greater than the output B, then a skip condition is found. The comparator includes corresponding pins for these values. The skip condition is provided on the Skip_LAT pin which is coupled to the SkipFF 375 circuit block. The SkipFF 375 circuit block is a circuit block including a flip flop which latches the SKIP 250 output pin when activated by a signal on the Skip_LAT pin.

Figure 18:
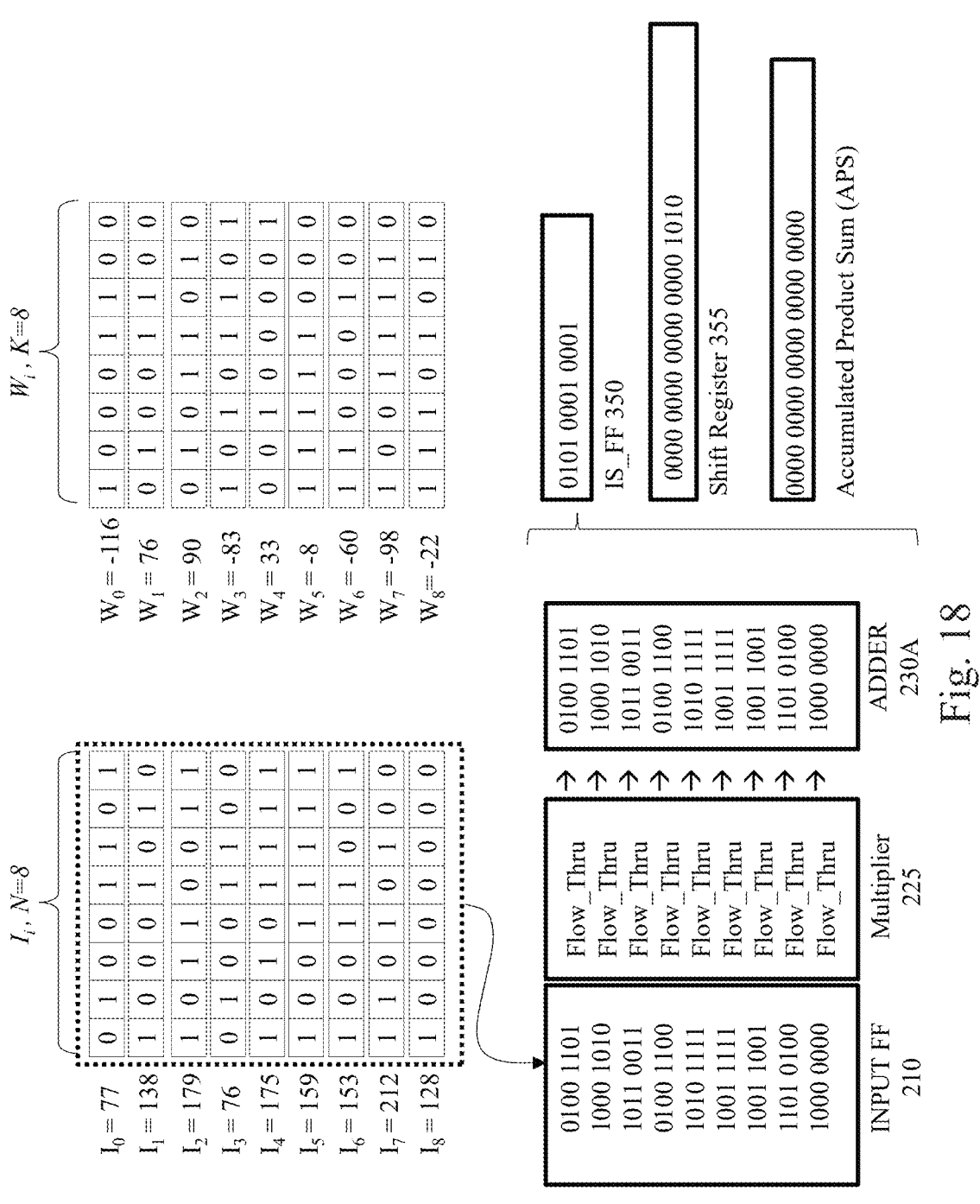
FIGS. 18 through 22 illustrate various views of the operation of the MAC skip circuit, in accordance with some embodiments.

The operation of the MAC skip circuit 200 of FIG. 15 may be demonstrated by walking through an example case in FIGS. 18 through 22 with reference to the circuit block diagrams in FIGS. 15, 16, and 17. FIG. 18 illustrates the same Input vectors and Weight vectors as used above with respect to FIG. 8. The Input vectors are latched in the INPUT FF 210. The first MSB bits of the weight vectors are latched in the WEIGHT FF 220. In FIG. 18, the Flow_Thru pin is activated in the Multiplier 225 and the input vectors are allowed to flow through the multiplier 225 regardless of the weight values. This is equivalent to multiplying each of the input vectors by a '1'. The input vectors are then added by the adder 230$a$ and the input sum 0101 0001 0001 (1297) is provided to the skip module 245. The input sum is latched in to the IS_FF 350. As noted above the number of bits in the IS_FF 350 $N_{IS}$=K+Roundup($\log_2$ M). The top $N_{IS}$–K+1 bits of the input sum are latched to the shift register 355. This is equivalent to dividing the input sum by $2^{N_{IS}-K+1}$, which in this case is $2^7$. The reason this is done is because the calculation for the product of the input vectors and the MSB of the weight vectors is not yet fully weighted. Each cycle will shift the partially accumulated product sum one place. Similarly, each cycle will shift the shift register one place. So utilizing the top $N_{IS}$–K+1 bits of the input sum ensures that the comparison is in the same multiplier.

For example, the partially accumulated product sum for the MSB of the weight bit equals $\Sigma$IN·W[7], before multiplying it by its place value of $2^7$. The remaining unprocessed weights may be reconciled as $\Sigma$IN·W[6]·$2^6$+$\Sigma$IN·W[5]·$2^5$+$\Sigma$IN·W[4]·$2^4$+$\Sigma$IN·W[3]·$2^3$+$\Sigma$IN·W[2]·$2^2$+$\Sigma$IN·W[1]·$2^1$+$\Sigma$IN·W[0]·$2^0$. In the worst case scenario, each of the weight bits is 1. Thus, the above formula can be rewritten as IS·$2^6$+IS·$2^5$+IS·$2^4$+IS·$2^3$+IS·$2^2$+IS·$2^1$+IS·$2^0$, where IS is equal to the case where all of the weight bits are 1. Factoring out IS, this is equivalent to IS·127. Because the place value of the partially accumulated product sum has not yet been shifted, the IS·127 is divided by 128, which can be obtained by calculating IS–IS/128, for example, $$\frac{IS\cdot127}{128} = \frac{IS\cdot127}{128} + \frac{IS}{128} - \frac{IS}{128} = \left(\frac{IS\cdot127}{128} + \frac{IS}{128}\right) - \frac{IS}{128} = IS - \frac{IS}{128}.$$

Accordingly, the skip threshold STH may be calculated by taking the top $N_{IS}$–K+1 bits of the input sum into the shift register 355, as described above, which is equivalent to dividing the input sum by 128. Then the shift register 355 may be subtracted from the input sum to obtain the STH.

Figure 19:
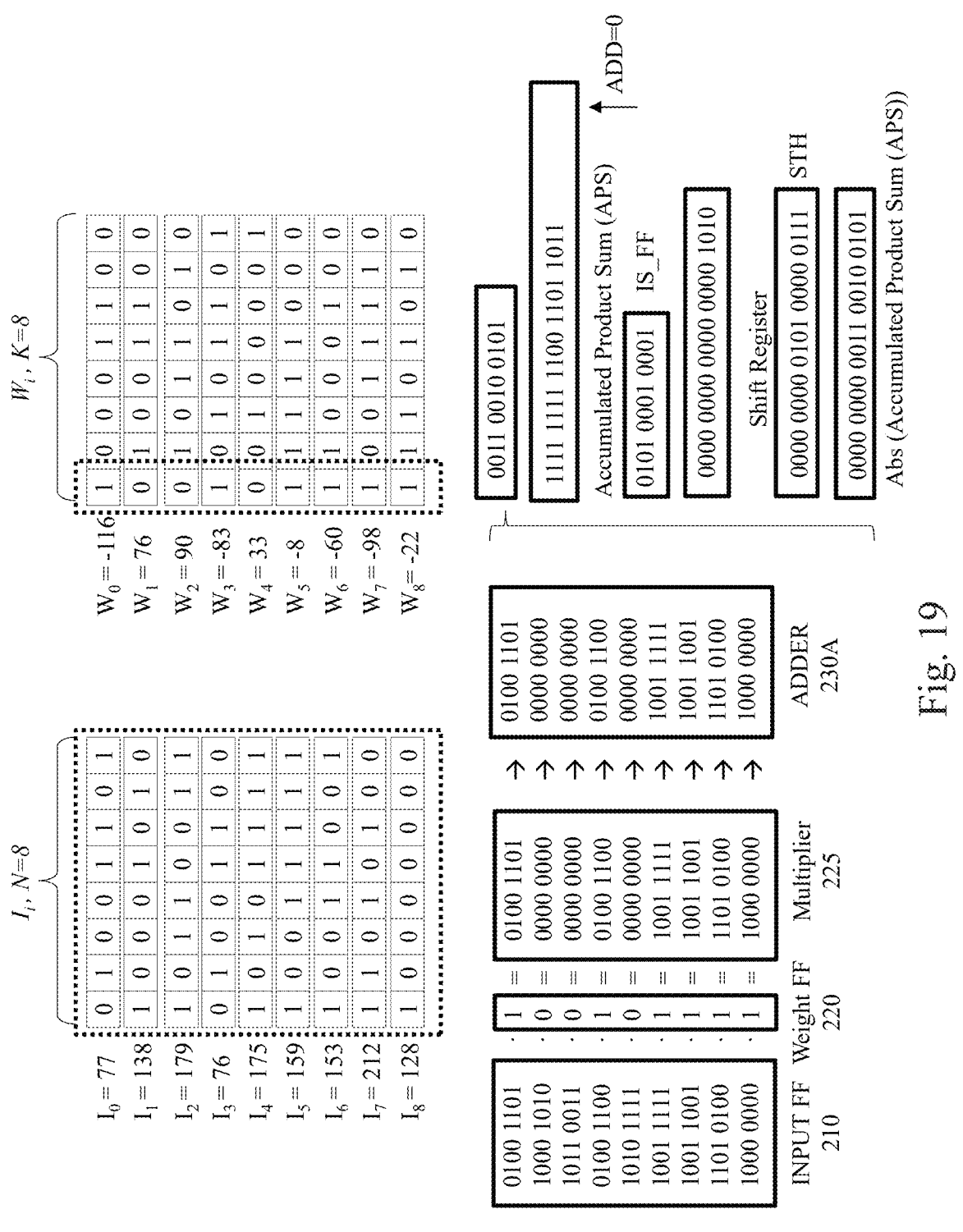

At FIG. 19, the first weight bit is processed. The various inputs are each multiplied by a respective one of the MSB of the weight vectors. These products are then added together to result in 0011 0010 0101 (−805). Because the first bit is the sign bit, this value is subtracted (ADD=0) from the initialized accumulated product sum (i.e., 0), putting the accumulated product sum into 2 s complement format. The skip threshold (STH) is calculated by subtracting Shift Register 1010 (10) as the subtrahend from IS_FF 0101 0001 0001 (1297) as the minuend. To determine whether a skip condition occurs the STH 0101 0000 0111 (1287) is compared to the absolute value 0011 0010 0101 (805) of the Accumulated product sum. Because the condition A>B is not met, then the next weight bit is processed in a subsequent cycle.

Figure 20:
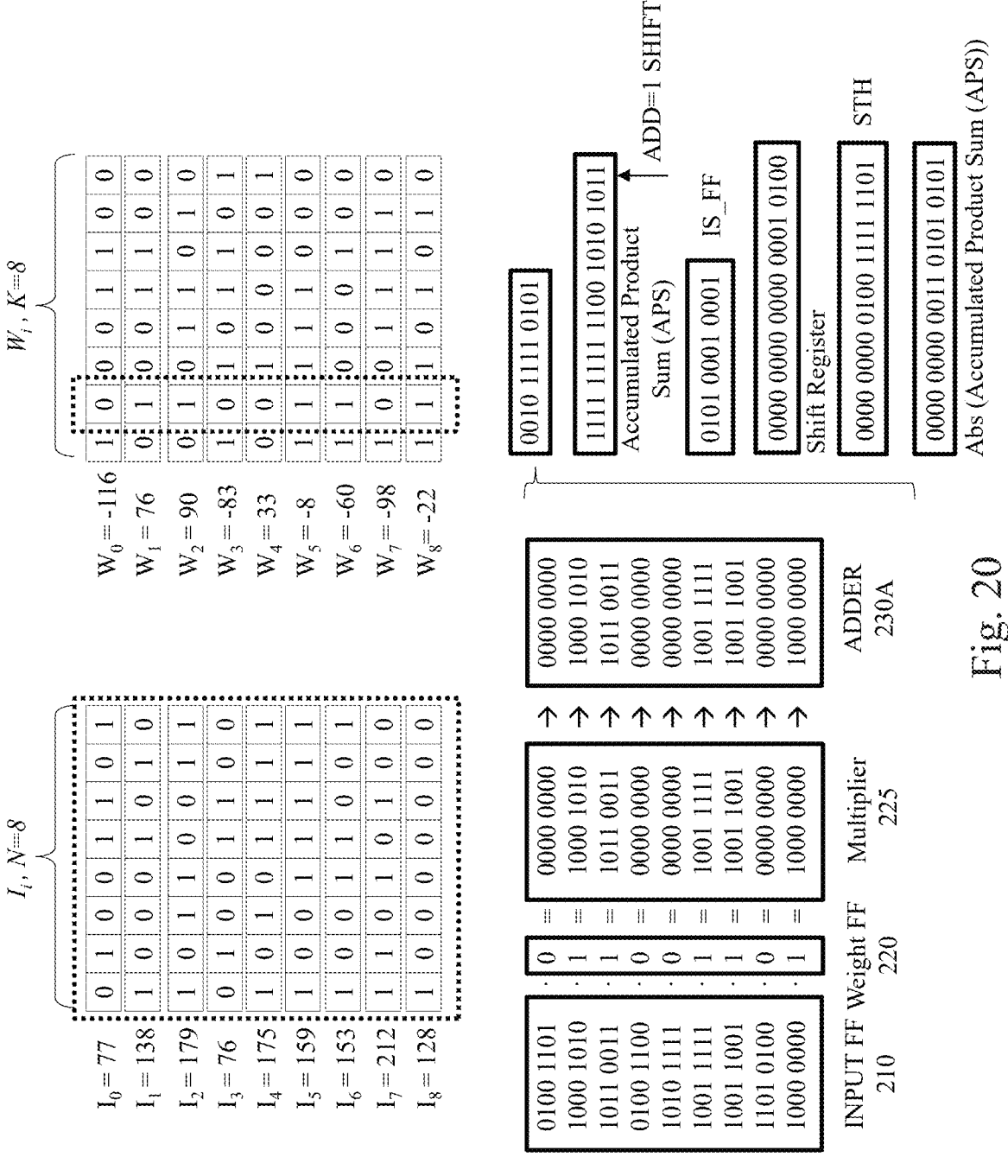

At FIG. 20, the accumulated product sum is left shifted, and the second weight bit is processed. The various inputs are each multiplied by a respective one of the next bits of the weight vectors. These products are then added together to result in 0010 1111 0101 (757). This value is added to the shifted accumulated product sum to result in 1111 1111 1100 1010 1011 (−853). So the accumulated product sum is equal to $\Sigma$IN·W[7]·$2^1$+$\Sigma$IN·W[6]. The shift register 355 is also shifted and subtracted again from the IS_FF 350 to find the skip threshold STH 0000 0000 0100 1111 1101 (1277). This is done because the worst case scenario is where IS·$2^5$+IS·$2^4$+IS $2^3$+IS·$2^2$+IS·$2^1$+IS·$2^0$, which is equal to IS·63. The shift register 355 was previously IS divided by 128, but because the accumulated product sum has been shifted once, it is also shifted once so that it is instead divided by 64. The value IS·63/64 may be found by the calculation IS–IS/64. Alternatively, the top $N_{IS}$–K bits of the input sum may be latched into the shift register 355, which would be equivalent to dividing the IS by 64. To determine whether a skip condition occurs the STH 0000 0000 0100 1111 1101 (1277) is compared to the absolute value 0011 0101 0101 (853) of the Accumulated product sum. Because the condition A>B is not met, then the next weight bit is processed in a subsequent cycle.

Figure 21:
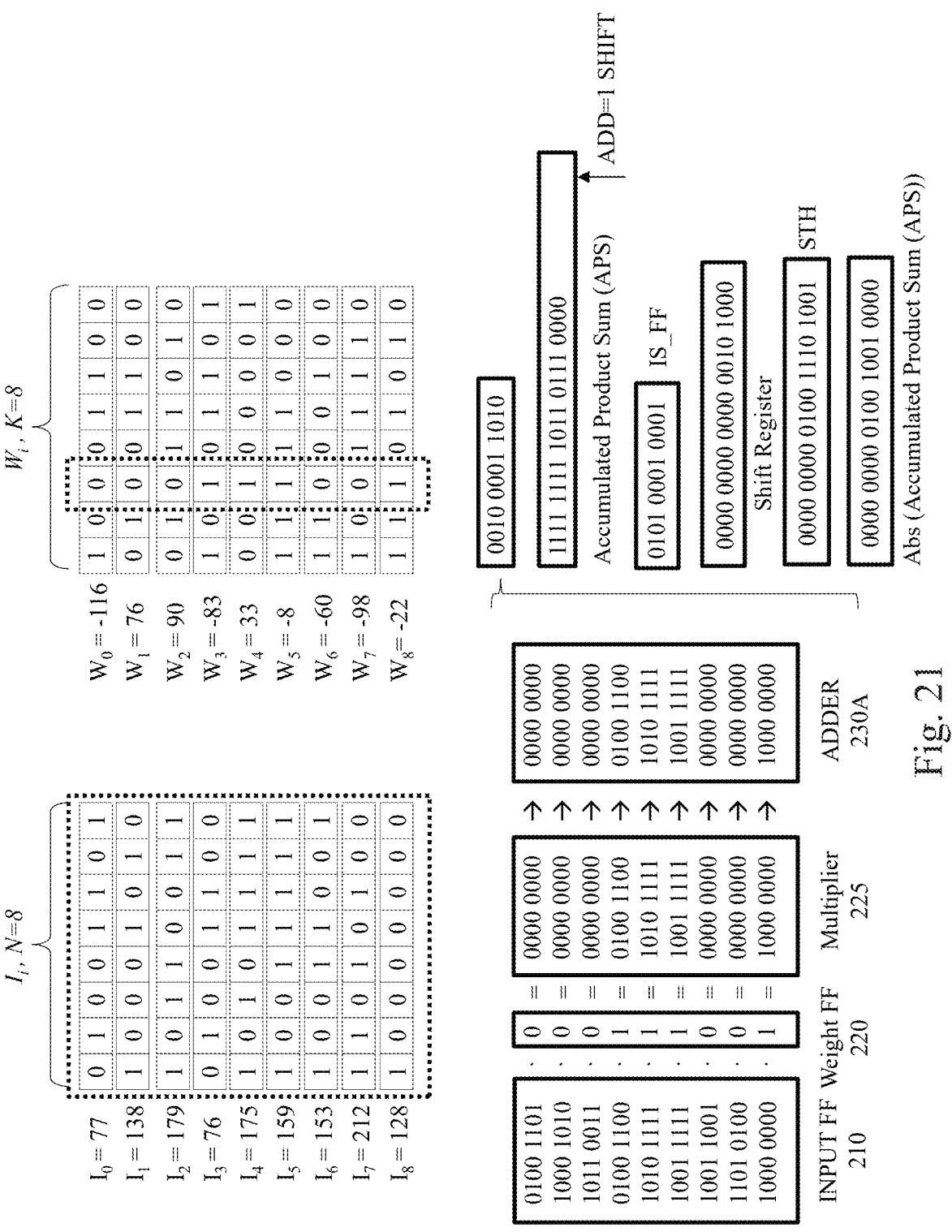

At FIG. 21, the accumulated product sum is left shifted, and the second weight bit is processed. The various inputs are each multiplied by a respective one of the next bits of the weight vectors. These products are then added together to result in 0010 0001 1010 (538). This value is added to the shifted accumulated product sum to result in 1111 1111 1011

0111 0000 (−1168). So the accumulated product sum is equal to $\Sigma IN \cdot W[7] \cdot 2^2 + \Sigma IN \cdot W[6] \cdot 2^1 + \Sigma IN \cdot W[5] \cdot 2^0$. The shift register 355 is also shifted and subtracted again from the IS_FF 350 to find the skip threshold STH 0000 0000 0100 1110 1001 (1257). This is done because the worst case scenario is where $IS \cdot 2^4 + IS \cdot 2^3 + IS \cdot 2^2 + IS \cdot 2^1 + IS \cdot 2^0$, which is equal to IS·31. The shift register 355 was previously IS divided by 64, but because the accumulated product sum has been shifted once, the shift register is also shifted once so that it is instead divided by 32. The value IS·$^{31}/_{32}$ may be found by the calculation IS−IS/32. Alternatively, the top $N_{IS}$−K−1 bits of the input sum may be latched into the shift register 355, which would be equivalent to dividing the IS by 32. To determine whether a skip condition occurs the STH 0000 0000 0100 1110 1001 (1257) is compared to the absolute value 0100 1001 0000 (1168) of the Accumulated product sum. Because the condition A>B is not met, then the next weight bit is processed in a subsequent cycle.

Figure 22:
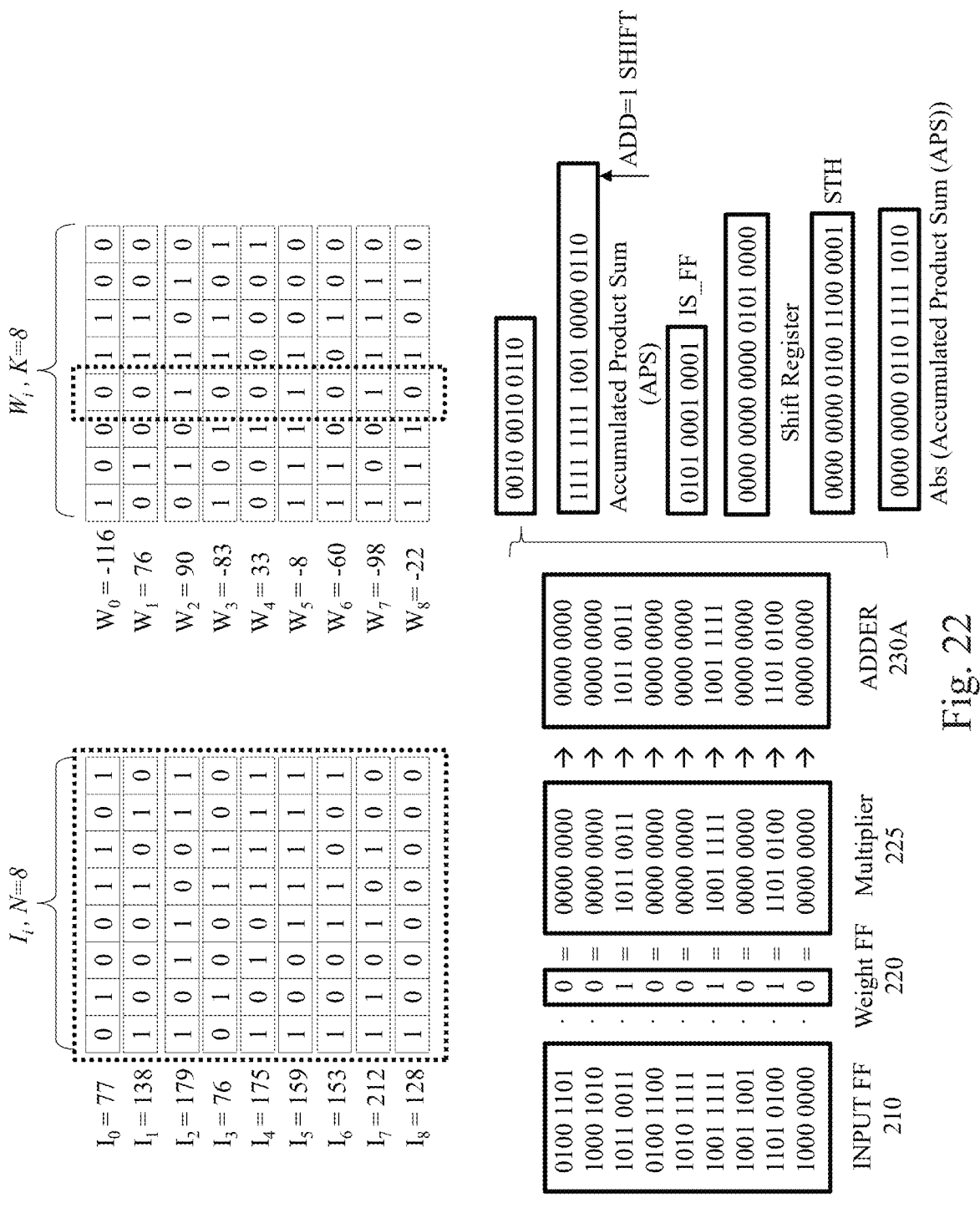

At FIG. 22, the accumulated product sum is left shifted, and the third weight bit is processed. The various inputs are each multiplied by a respective one of the next bits of the weight vectors. These products are then added together to result in 0010 0010 0110 (550). This value is added to the shifted accumulated product sum to result in 1111 1111 1001 0000 0110 (−1786). So the accumulated product sum is equal to $\Sigma IN \cdot W[7] \cdot 2^3 + \Sigma IN \cdot W[6] \cdot 2^2 + \Sigma IN \cdot W[5] \cdot 2^1 + \Sigma IN \cdot W[4] \cdot 2^0$. The shift register 355 is also shifted and subtracted again from the IS_FF 350 to find the skip threshold STH 0000 0000 0100 1100 0001 (1217). This is done because the worst case scenario is where $IS \cdot 2^3 + IS \cdot 2^2 + IS \cdot 2^1 + IS \cdot 2^0$, which is equal to IS·15. The shift register 355 was previously IS divided by 32, but because the accumulated product sum has been shifted once, the shift register is also shifted once so that it is instead divided by 16. The value IS·$^{15}/_{16}$ may be found by the calculation IS−IS/16. Alternatively, the top $N_{IS}$−K−2 bits of the input sum may be latched into the shift register 355, which would be equivalent to dividing the IS by 16. To determine whether a skip condition occurs the STH 0000 0000 0100 1110 1001 (10000 0000 0100 1100 0001 (1217) is compared to the absolute value 0110 1111 1010 (1786) of the Accumulated product sum. Because the condition A>B is met, then the remaining processing of the weight bits is aborted and the output may be provided to a circuit implementing an activation function, such as the ReLU activation function.

Supposing that the threshold was not met, the processing would continue in much the same way for the next cycle. The various inputs would be multiplied by the next bits of the weight vectors. These products are then added together to result in the Adder 230A output. This value is then added to the shifted accumulated product sum to result in $\Sigma IN \cdot W[7] \cdot 2^4 + \Sigma IN \cdot W[6] \cdot 2^3 + \Sigma IN \cdot W[5] \cdot 2^2 + \Sigma IN \cdot W[4] \cdot 2^1 + \Sigma IN \cdot W[3] \cdot 2^0$. The shift register 355 is also shifted and subtracted again from the IS_FF 350 to find the skip threshold. This is done because the worst case scenario is where $IS \cdot 2^2 + IS \cdot 2^1 + IS \cdot 2^0$, which is equal to IS·7. The shift register was previously IS divided by 16, but because the accumulated product sum has been shifted once, the shift register is also shifted once so that it is instead divided by 8. The value IS·$^7/_8$ may be found by the calculation IS−IS/8. Alternatively, the top $N_{IS}$−K−3 bits of the input sum may be latched into the shift register 355, which would be equivalent to dividing the IS by 8. To determine whether a skip condition occurs the STH is compared to the absolute value of the Accumulated product sum.

Supposing that the threshold was not met, the processing would continue in the same way for the next cycle. The various inputs would be multiplied by the next bits of the weight vectors. These products are then added together to result in the Adder 230A output. This value is then added to the shifted accumulated product sum to result in $\Sigma IN \cdot W[7] \cdot 2^5 + \Sigma IN \cdot W[6] \cdot 2^4 + \Sigma IN \cdot W[5] \cdot 2^3 + \Sigma IN \cdot W[4] \cdot 2^2 + \Sigma IN \cdot W[3] \cdot 2^1 + \Sigma IN \cdot W[2] \cdot 2^0$. The shift register 355 is also shifted and subtracted again from the IS_FF 350 to find the skip threshold. This is done because the worst case scenario is where $IS \cdot 2^1 + IS \cdot 2^0$, which is equal to IS·3. The shift register was previously IS divided by 8, but because the accumulated product sum has been shifted once, the shift register is also shifted once so that it is instead divided by 4. The value IS·$^3/_4$ may be found by the calculation IS−IS/4. Alternatively, the top $N_{IS}$−K−4 bits of the input sum may be latched into the shift register 355, which would be equivalent to dividing the IS by 4. To determine whether a skip condition occurs the STH is compared to the absolute value of the Accumulated product sum.

Supposing that the threshold was not met, the processing would continue in the same way for the next cycle. The various inputs would be multiplied by the next bits of the weight vectors. These products are then added together to result in the Adder 230A output. This value is then added to the shifted accumulated product sum to result in $\Sigma IN \cdot W[7] \cdot 2^6 + \Sigma IN \cdot W[6] \cdot 2^5 + \Sigma IN \cdot W[5] \cdot 2^4 + \Sigma IN \cdot W[4] \cdot 2^3 + \Sigma IN \cdot W[3] \cdot 2^2 + \Sigma IN \cdot W[2] \cdot 2^1 + \Sigma IN \cdot W[1] \cdot 2^0$. The shift register 355 is also shifted and subtracted again from the IS_FF 350 to find the skip threshold. This is done because the worst case scenario is where $IS \cdot 2^0$, which is equal to IS. The shift register was previously IS divided by 4, but because the accumulated product sum has been shifted once, the shift register is also shifted once so that it is instead divided by 2. The value IS·$^1/_2$ may be found by the calculation IS−IS/2. Alternatively, the top $N_{IS}$−K−5 bits of the input sum may be latched into the shift register 355, which would be equivalent to dividing the IS by 2. To determine whether a skip condition occurs the STH is compared to the absolute value of the Accumulated product sum.

Supposing that the threshold was not met, the processing would continue in the same way for the next cycle. If the number K of weight bits equals 8, as in this example, this is the last cycle since there would be no more unknown weight values. The various inputs would be multiplied by the next bits of the weight vectors. These products are then added together to result in the Adder 230A output. This value is then added to the shifted accumulated product sum to result in $\Sigma IN \cdot W[7] \cdot 2^7 + \Sigma IN \cdot W[6] \cdot 2^6 + \Sigma IN \cdot W[5] \cdot 2^5 + \Sigma IN \cdot W[4] \cdot 2^4 + \Sigma IN \cdot W[3] \cdot 2^3 + \Sigma IN \cdot W[2] \cdot 2^2 + \Sigma IN \cdot W[1] \cdot 2^1 + \Sigma IN \cdot W[0] \cdot 2^0$. Since all the weight bits have been processed the output is provided to a circuit implementing an activation function, such as the ReLU activation function.

Figure 23B:
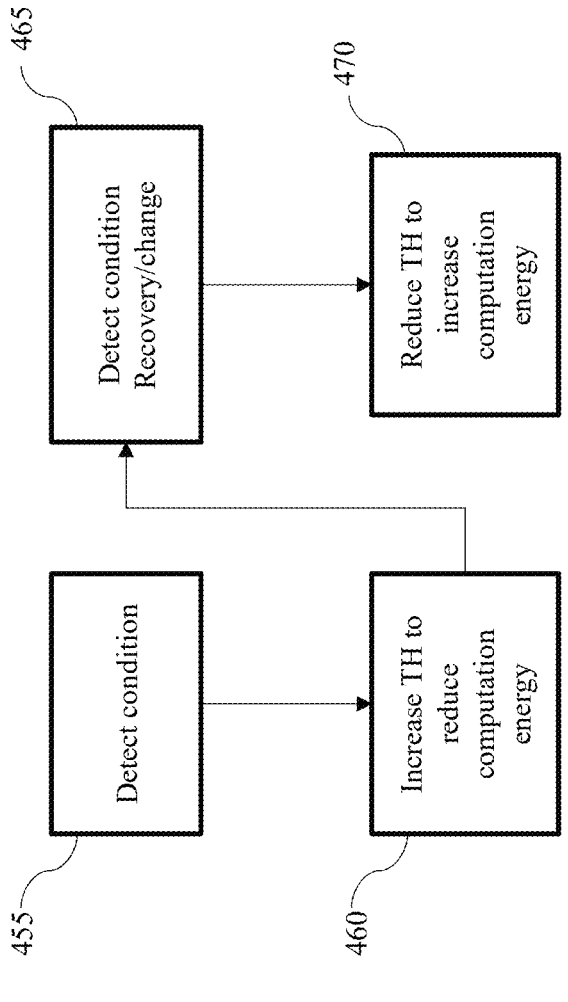
FIGS. 23A and 23B illustrate flow diagrams for providing a threshold to the skip module, in accordance with some embodiments.
Figure 23A:
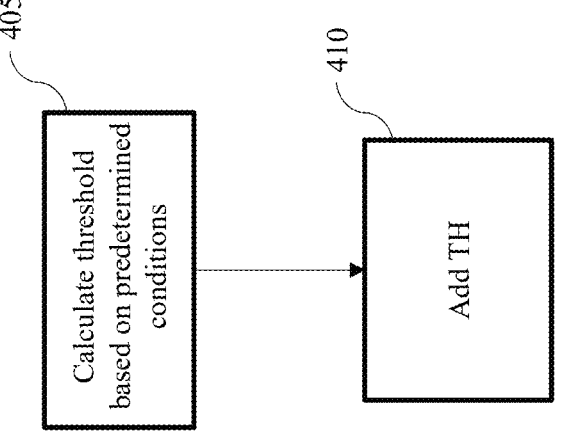

Referring to FIGS. 23A and 23B, flow diagrams are shown which illustrate the use of the threshold TH, as noted in FIG. 17. As noted above, the skip condition is detected when the Abs(accumulated product sum)>STH. The threshold TH may be an added value which can be used to relax the conditions necessary to trip a skip condition. As noted above, for example, the calculation of the STH is based on an assumption of a worst case scenario for the weighting vectors. As it is unlikely that all the bits of the weighting vectors are '1', relaxing the requirements by adding the threshold TH may result in less computational energy without introducing an unacceptable amount of error (which may occur, for example, if adding the threshold TH results in skipping a value which should not have been skipped).

In FIG. 23A, in some embodiments, the threshold TH may be a predefined value based on some known statistical characteristics of the weighting vectors and an error tolerance. For example, if it is known that an error tolerance allows a relaxation of the worst case, the threshold TH may be equal to a divided portion of the input sum. For example, the threshold may be equal to the input sum divided by 4, 8, or 16. In other embodiments, the threshold TH may be a predefined value based on the accumulated product sum (APS). For example, the threshold TH may be equal to a portion of the Abs(APS) added back to itself, such as Abs(APS)+Abs(APS)/8. In yet other embodiments, the threshold TH may be a constant, such as a value 128, or some other value. At element 405, the threshold TH is calculated based on predetermined conditions, such as any of those noted above. In such embodiments, the threshold TH is either a constant or is calculated based on one of the numeric values available such as the input sum or the APS. At element 410, the TH is added to the Abs(APS) prior to going into the comparator 365. Effectively, the comparator 365 determines A+TH>B? or A>B−TH?. It is noted that although the TH is shown as being added to the Abs(APS), the TH could be subtracted from the minuend (IS_FF) or added to the subtrahend (from shift register 355) prior to going into the subtractor 360.

In FIG. 23B, in some embodiments, the threshold TH may be a dynamic value which is calculated based on some external factors, or which may use a predetermined component as described above plus a dynamic component as discussed here. For example, if resources for the computational device are low (battery, power, memory, processing availability, etc.), the threshold may be increased. At element 455 a condition is detected, the condition including some external factor, such as low computational resources, high temperature, failed cooling condition, motion, and so forth. At 460, the TH is increased to reduce the computation energy. If the TH is increased, the likelihood that a skip condition is triggered is also increased. In some embodiments, the TH may be based on a predetermined TH as described above, but then adjusted to further reduce the computation energy. Increasing the TH has the potential negative impact of increasing error. In other embodiments, the TH may be equal to o. At 465, it is detected that the condition has recovered or changed to allow more computational resources to be utilized. At 470, the TH is reduced to increase computation energy and reduce error.

Figure 24A:
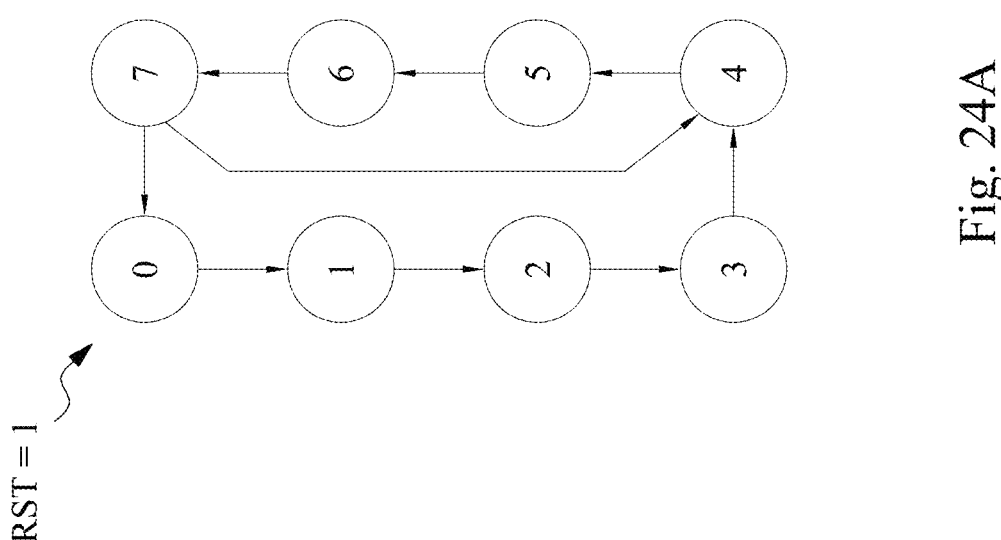

In FIGS. 24A, 24B, and 25 information regarding the states is provided. It should be understood that this information may be changed depending on the operation parameters and characteristics of the actual parts used. For example, a shift register may use combinational logic so that the latch signal interacts with the shift signal in a particular way. As another example, in some hardware, the multiplier 225 and adder 230*a* circuit blocks may immediately begin computations without a separate state. FIG. 24A provides a state diagram and FIG. 24B describes the basic processes accomplished during each state. CNT in this description has a value between 0 and 7 for the sake of simplicity. It should be understood that 7 here is the value K−1 where K=8 for the number of bits in each of the weight vectors. If K is a different number, then the value '7' can be replaced as appropriate.

At State 0, the MAC is idle, the Skip is idle, and Memory is idle. State 0 is a ready state. It is also the return state when the computations associated with the other states have been completed. It is also the return state when a RST signal is asserted during any other state. As noted in FIG. 25, at State 0, the OUT_RDY signal is high and the Accumulated Product Sum may be available for use by an activation function. State 1 is entered if the RST=0 && NEXT is triggered && START=1.

At State 1, memory reads input vectors 205 and provides those values on the pins of the MAC skip circuit 200. The input vectors 205 are latched into the INPUT FF 210. As such, the output of the INPUT_FF 210 immediately has its output available to the multiplier 225 circuit block. The Flow_Thru pin is active, allowing the input vectors 205 to flow through the multiplier 225 circuit block to the adder 230*a*. The adder 230*a* will add the input vectors 205 together and produce an input sum (IS) to the skip module 245. As noted in FIG. 25, at State 1, the IN_LAT pin is active, the Flow_Thru pin is active. State 2 is entered if the RST=0 && NEXT is triggered.

At State 2, the input sum IS is latched into the IS_FF 350 of the Skip Module 245. As noted in FIG. 25, at State 2, the Flow_Thru pin is active and the SkipFF_LAT pin is active. State 3 is entered if the RST=0 && NEXT is triggered.

At State 3, memory reads the MSB of the weight vectors 215 which is latched into the WEIGHT FF 220. In the Skip Module 245, the top $N_{IS}$−K−1 bits of the IS is latched into the shift register 355. As noted in FIG. 25, at State 3, the W_LAT pin is active and the SkipSR_LAT pin is active. State 4 is entered if the RST=0 && NEXT is triggered.

At State 4, the input vectors 205 are provided by the INPUT_FF 210 and the current weight bits are provided by the WEIGHT_FF 220 to the multiplier 225 circuit block, which multiplies the input vectors 205 by the current weight bits and provides the output to the adder 230*a*. The product sum is provided to the accumulator 230*b*. In some embodiments, the product sum can be provided in the previous state (e.g., if the latching operation immediately provides input to the multiplier 225). If the CNT=0 then the ADD signal is inactive and the product sum will be subtracted, since product sum should be negative because it would represent the product sum of the sign bit of the weight vectors 215. If the CNT=0 then the partial accumulated product sum is 0. If the CNT!=0, then the partial product sum has been shifted from a prior State 7 execution. After the accumulator adds together the partial accumulated product sum APS from the shift register 235 with the current product sum, it is ready at output pins of the Accumulator 230*b*. The counter is then increased to signify that the current bit has been processed. As noted in FIG. 25, at State 4, the CNT_plus pin is active. State 5 is entered if the RST=0 && NEXT is triggered.

At State 5, the new accumulated product sum APS is latched into the shift register 235, and provided to the skip module 245, where the skip module 245 compares the abs(APS) with the STH via the comparator 365 circuit block. As noted in FIG. 25, at State 5, the ACC_LAT pin is active to signify latching the accumulated product sum APS. State 6 is entered if the RST=0 && NEXT is triggered.

At State 6, the result of the skip comparison is latched in the SkipFF 375. As noted in FIG. 25, at State 6, the SKIP_LAT pin is active (unless the CNT=7, because then all of the bits are already processed). State 7 is entered if the RST=0 && NEXT is triggered.

At State 7, if the CNT !=7, the shift register 235 is left shifted to prepare for the next weight bit processing, the memory reads the next bit of the weight vectors, and the next bit of the weight vectors is latched in the WEIGHT_FF 220. State 4 is entered next if the RST=0 && NEXT is triggered && CNT !=7. This signifies that there are other weight bits to process and a skip has not been asserted. State 0 is entered if RST=0 && NEXT is triggered && CNT=7 signifying that all of the weight bits have been processed. State 0 is also entered if SKIP=1 regardless of the CNT value, aborting further processing of the remaining weight bits. As noted in FIG. 25, at State 7, (if the CNT !=7) the W_LAT, the ACC_SHIFT pin is active to signify shifting the shift register 235, and the SkipSHIFT pin is active.

Figure 26:
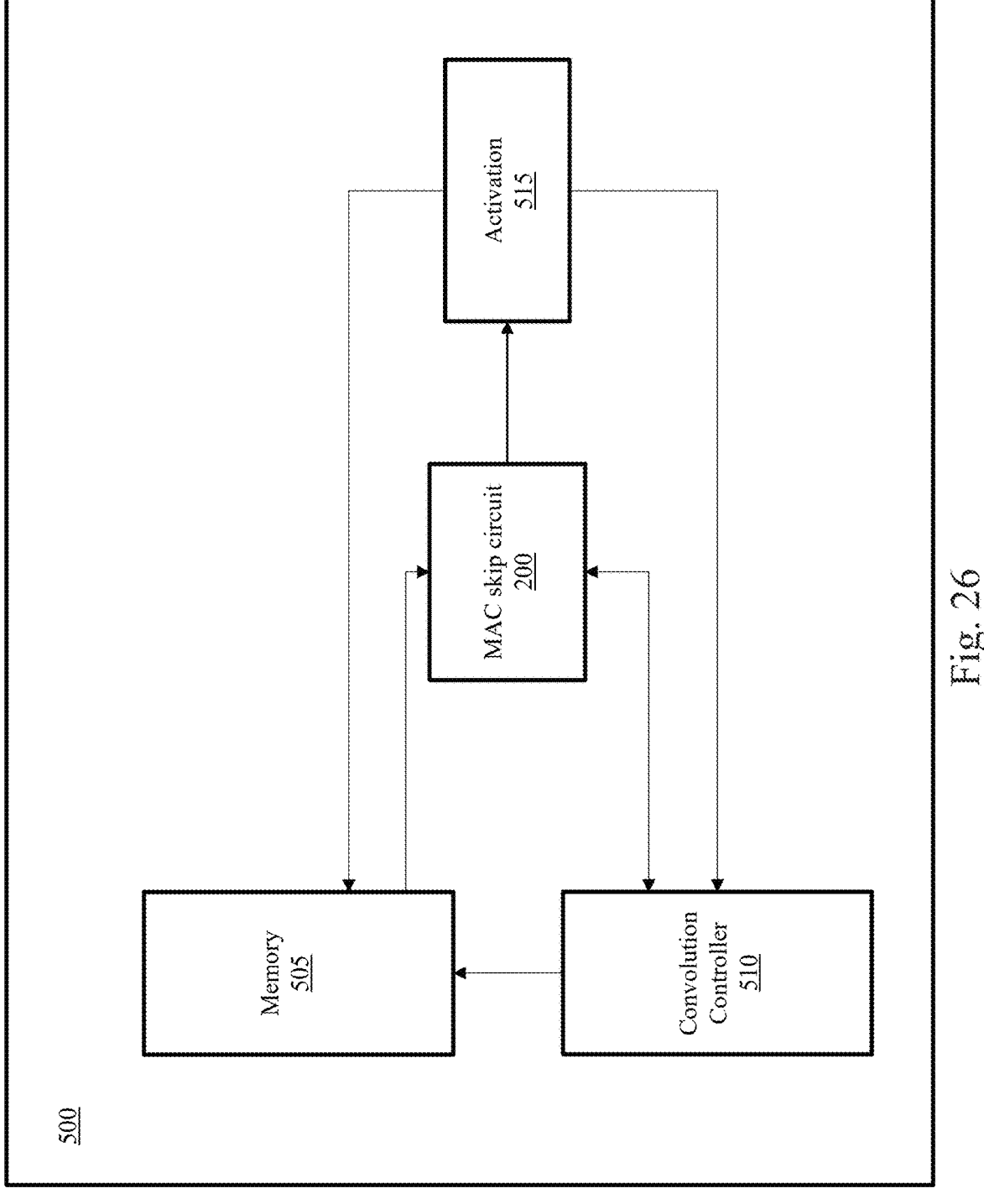
FIG. 26 illustrates a system diagram including the MAC skip circuit, in accordance with some embodiments.

FIG. 26 is a system diagram of a system 500 utilizing the MAC skip circuit. Memory 505 is coupled to the MAC skip circuit 200 to provide input data and weights to the MAC skip circuit 200. The Memory 505 may be any suitable memory device and medium for storing non-transitory computer readable data. A controller 510, e.g., a convolution controller 510, is coupled to the MAC skip circuit 200 and to the Memory 505. The controller 510 provides control signals and logic to instruct the MAC skip circuit 200 to operate, such as the START and NEXT control signals. The MAC skip circuit 200 also provides the controller 510 status signals, such as the OUT_READY signal. The controller 510 also instructs the Memory 505 which inputs and weights to provide to the MAC skip circuit. The activation function 515 takes the output of the MAC skip circuit 200 and applies an activation function to the output, such as, for example, the ReLU activation function. The result may then be stored back into the memory 505 and provided to the controller 510.

Figure 27:
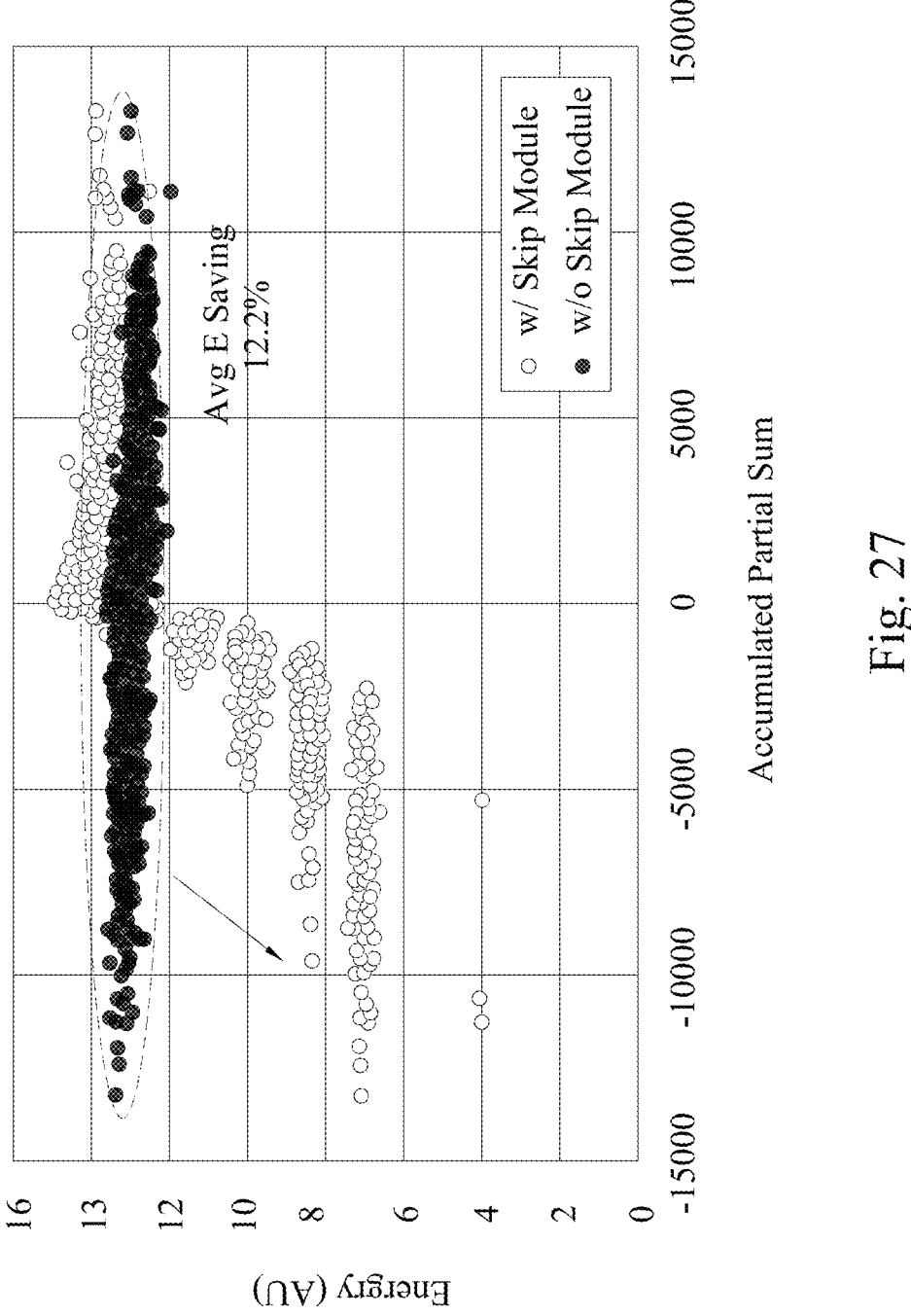
FIG. 27 illustrates results from test data utilizing the MAC skip circuit to reduce energy consumption, in accordance with some embodiments.

FIG. 27 illustrates results from a run of sample tests. The graph illustrates the energy required to run each data point of the accumulated partial sum. The dashed oval encircles the accumulated partial sums resulting from processing without the skip module. As noted in the graph, when the accumulated partial sum is greater than zero, the energy used for computing an accumulated partial sum is greater using the skip module than without the skip module. However, when the accumulated partial sum is only moderately less than 0, the energy requirement is much less when using the skip module. In this example, the average energy savings is about 12.2% using the skip module. An energy savings between 10% and 40% may be realized.

The computational complexity of the MAC process described above increases with a greater number M of inputs and weighting vectors. Knowing that the ReLU activation function only stores the output value of the MAC if it is positive and stores zero if the output value of the MAC is negative, embodiments provide a processing method, circuit, and system which can optionally skip the remaining of the processing of the input data to save on computational power. Embodiments calculate the product sum iteratively. After each iteration a skip function block evaluates the partial accumulated product sum. If the partial accumulated product sum is so negative that the remaining operations could not bring the result to be positive, then the remaining computation is skipped. Skipping the remaining computation provides decreased computational cycles and decreased memory calls.

One embodiment is a method including performing a partial sum accumulation of a product of input vectors and weight vectors in a wordwise-input and bitwise-weight manner to result in a partial accumulated product sum. The method also includes comparing the partial accumulated product sum with a threshold condition. The method also includes, when the partial accumulated product sum meets the threshold condition, asserting a skip indicator to indicate that remaining computations of a sum accumulation are skipped.

In an embodiment, the method further includes: skipping a partial sum accumulation of a product of the input vectors and at least one bit position of the weight vectors. In an embodiment, the threshold condition is a dynamically calculated threshold condition. In an embodiment, the skip indicator is asserted when the partial accumulated product sum is negative and a remaining set of unknown weight bits would be unable to render the partial accumulated product sum positive. In an embodiment, the remaining set of unknown weight bits are each assumed to be 1. In an embodiment, the method further includes: performing an activation function on the partially accumulated product sum and recording an output of the activation function to be equal to the greater value of 0 or the partially accumulated product sum. In an embodiment, the method further includes, when the partial accumulated product sum is less than the threshold condition: performing a second partial sum accumulation of a product of the input vectors and a remaining portion of the weight vectors in a wordwise-input and bitwise-weight manner to result in a second partial accumulated product sum.

Another embodiment is a device including a multiply accumulate circuit block configured to respectively multiply a set of m input vectors by first weight bits of a set of m weight vectors to calculate a first set of m products, add the first set of m products together to calculate a first product sum, and provide the first product sum on a product sum output pin set. The device also includes an accumulator circuit block including an accumulator input pin set coupled to the product sum output pin set, the accumulator circuit block configured to accumulate a first value by receiving the first value on the accumulator input pin set and adding the first value to an accumulated value in the accumulator circuit block to replace the accumulated value, and provide the accumulated value on an accumulated value output pin set. The device also includes a skip circuit block including an accumulated value input pin set coupled to the accumulated value output pin set, the skip circuit block configured to compare the accumulated value to a threshold value and, when the threshold value is met, assert a skip signal on a skip pin, a control circuit block configured to check the skip pin for the skip signal and when the skip signal is unasserted: cause the multiply accumulate circuit block process next weight bits of the set of m weight vectors, and when the skip signal is asserted: terminate processing a remainder of the set of m weight vectors, assert an output ready signal, and provide the accumulated value to an activation circuit.

In an embodiment, the skip circuit block includes: a subtraction circuit block configured to subtract a shifted input sum from an input sum to calculate the threshold value, the shifted input sum shifted a number of times based on a weight bit position of the set of M weight vectors being processed, and compare the threshold value to the accumulated value. In an embodiment, the threshold value is a first threshold value, where the subtraction circuit block is further configured to alter the accumulated value by adding a second threshold value to the accumulated value prior to comparing the first threshold value to the accumulated value. In an embodiment, the second threshold value is a constant value, a derived value based on the input sum or the accumulated value, or a dynamic value based on an environmental variable, the environmental variable including a power status, battery status, hardware status, or resource status. In an embodiment, the accumulator circuit block includes an add pin, where the accumulator circuit block is configured to subtract the first value from the accumulated value when controlled by the add pin, where the control circuit block is further configured to control the accumulator circuit block via the add pin to subtract the first value when the first weight bits correspond to most significant bits of the set of M weight vectors. In an embodiment, the device further includes: an input latch circuit block configured to store the set of m input vectors; a weight bit latch circuit block configured to store the set of M weight bits; and the multiply accumulate circuit block including a multiply block and adder tree to calculate the first product sum.

Another embodiment is a system including a multiply accumulate device configured to respectively calculate products of an input node and weight vectors in an input by bitwise-weight manner and sum each of the products to calculate a product sum for each bit, weight the product sum according to a bit-value position for each bit, and accumulate the product sum as an accumulated product sum. The system also includes a skip module configured to compare the product sum to a threshold and assert a skip signal when the threshold is met. The system also includes a control logic device configured, when the skip signal is unasserted, to cause the multiply accumulate device to process a next bit of the weight vectors, and when the skip signal is asserted, to cause the multiply accumulate device to abort processing remaining portions of the weight vectors. The system also includes an activation device, the activation device determining a convolution value of the input node based on a value of the accumulated product sum.

In an embodiment, the skip module is configured to evaluate the product sum after each weight bit is processed. In an embodiment, the threshold of the skip module is calculated based on an input sum of all inputs of the input node. In an embodiment, the threshold of the skip module is calculated by subtracting a bit-shifted input sum from the input sum, the bit-shifted input sum shifted by a number of bits corresponding to a bit position of a currently evaluated weight bit. In an embodiment, the threshold is a first threshold, the skip module further configured to add a second threshold to an absolute value of the product sum and compare it to the first threshold, and if greater than the first threshold, assert the skip signal. In an embodiment, the second threshold is a predetermined threshold based on a current value of the product sum, an input sum of all inputs of the input node, or a constant value. In an embodiment, the second threshold is a dynamic threshold based on an environmental factor, the environmental factor including one or more of power status, battery level, computational resource availability, or hardware failure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
a multiply accumulate circuit block configured to respectively multiply a set of M input vectors by first weight bits of a set of M weight vectors to calculate a first set of M products, add the first set of M products together to calculate a first product sum, and provide the first product sum on a product sum output pin set;
an accumulator circuit block comprising an accumulator input pin set coupled to the product sum output pin set, the accumulator circuit block configured to receive a first value on the accumulator input pin set, add the first value to an accumulated value stored in the accumulator circuit block to generate an updated accumulated value, replace the accumulated value with the updated accumulated value, and provide the updated accumulated value on an accumulated value output pin set;
a skip circuit block comprising an accumulated value input pin set coupled to the accumulated value output pin set, the skip circuit block configured to receive the updated accumulated value on the accumulated value output pin set, compare the updated accumulated value to a threshold value to detect a skip condition, and in response to detection of the skip condition, assert a skip signal on a skip pin, wherein the skip circuit block comprises a subtraction circuit block configured to subtract a shifted input sum from an input sum to calculate the threshold value, the shifted input sum shifted a number of times based on a weight bit position of the set of M weight vectors being processed; and
a control circuit block configured to check the skip pin for the skip signal and in response to detecting that the skip signal is asserted: terminate processing remaining weight bits of the set of M weight vectors, assert an output ready signal, and provide the updated accumulated value to an activation circuit.

2. The device of claim 1, wherein the threshold value is a first threshold value, wherein the subtraction circuit block is further configured to alter the updated accumulated value by adding a second threshold value to the updated accumulated value prior to comparing the first threshold value to the updated accumulated value.

3. The device of claim 2, wherein the second threshold value is a constant value, a derived value based on the input sum or the updated accumulated value, or a dynamic value based on an environmental variable, the environmental variable including a power status, battery status, hardware status, or resource status.

4. The device of claim 1, wherein the accumulator circuit block comprises an ADD pin, wherein the accumulator circuit block is configured to add the first value to the accumulated value when a control signal at the ADD pin has a first logic value, wherein the accumulator circuit block is configured to subtract the first value from the accumulated value when the control signal at the ADD pin has a second logic value.

5. The device of claim 4, wherein the control circuit block is further configured to set the control signal at the ADD pin to the second logic value when the first weight bits are most significant bits (MSBs) of the set of M weight vectors.

6. The device of claim 5, wherein the control circuit block is further configured to set the control signal at the ADD pin to the first logic value when the first weight bits are not MSBs of the set of M weight vectors.

7. The device of claim 1, further comprising:
an input latch circuit block configured to store the set of M input vectors; and
a weight bit latch circuit block configured to store the set of M weight vectors,
wherein the multiply accumulate circuit block comprises a multiplier and an adder tree to calculate the first product sum.

8. The device of claim 1, wherein the skip circuit block is configured to detect the skip condition by:
comparing an absolute value of the updated accumulated value with the threshold value; and

in response to detecting that the absolute value of the updated accumulated value is larger than the threshold value, declaring that the skip condition is detected.

9. The device of claim 8, wherein the control circuit block is further configured to, in response to detecting that the skip signal is not asserted, instruct the multiply accumulate circuit block to process second weight bits of the set of M weight vectors next to the first weight bits.

10. The device of claim 8, further comprising the activation circuit, wherein the activation circuit is configured to:
output a zero value when the updated accumulated value is less than or equal to zero; and
output the updated accumulated value when the updated accumulated value is larger than zero.

11. The device of claim 1, wherein the input sum is a sum of the set of M input vectors.

12. A device comprising:
a multiply accumulate circuit configured to:
receive a set of M input vectors and a set of M weight vectors, wherein each input vector in the set of M input vectors has a corresponding weight vector in the set of M weight vectors;
calculate a first set of M products by performing an element-wise multiplication between the set of M input vectors and a first bit vector of length M, wherein the first bit vector comprises weight bits at a first bit location of the set of M weight vectors;
add the first set of M products together to calculate a first product sum; and
provide the first product sum to an output terminal of the multiply accumulate circuit;
an accumulator circuit, wherein an input terminal of the accumulator circuit is coupled to the output terminal of the multiply accumulate circuit, wherein the accumulator circuit is configured to:
subtract a first value at the input terminal of the accumulator circuit from an accumulated value stored in the accumulator circuit to generate an updated accumulated value, when the first bit location is a most significant bit (MSB) location of the set of M weight vectors;
add the first value at the input terminal of the accumulator circuit to the accumulated value stored in the accumulator circuit to generate the updated accumulated value, when the first bit location is not the MSB location of the set of M weight vectors;
replace the accumulated value stored in the accumulator circuit with the updated accumulated value; and
provide the updated accumulated value to an output terminal of the accumulator circuit;
a skip circuit, wherein an input terminal of the skip circuit is coupled to the output terminal of the accumulator circuit, wherein the skip circuit is configured to:
receive the updated accumulated value from the output terminal of the accumulator circuit;
compare the updated accumulated value to a threshold value; and
in response to detecting that an absolute value of the updated accumulated value is larger than the threshold value, assert a skip signal on an output pin of the skip circuit, wherein the skip circuit is configured to generate the threshold value for weight bits at non-MSB bit locations of the set of M weight vectors by: shifting a value stored in the skip circuit to the left by one bit to generate a bit-shifted value; and

subtracting the bit-shifted value from an input sum, wherein the input sum is a sum of the set of M input vectors; and
a control circuit coupled to the multiply accumulate circuit, the accumulator circuit, and the skip circuit, wherein the control circuit is configured to:
check the skip signal on the output pin of the skip circuit; and
in response to detecting that the skip signal is asserted, terminate processing for remaining weight bits of the set of M weight vectors and assert an output ready signal.

13. The device of claim 12, wherein the control circuit is configured to initialize the accumulated value stored in the accumulator circuit to zero.

14. The device of claim 13, wherein the control circuit is further configured to, in response to detecting that the skip signal is not asserted, instruct the multiply accumulate circuit to:
calculate a second set of M products by performing an element-wise multiplication between the set of M input vectors and a second bit vector of length M, wherein the second bit vector comprises weight bits at a second bit location of the set of M weight vectors, wherein the second bit location is adjacent to the first bit location;
add the second set of M products together to calculate a second product sum; and
provide the second product sum to the output terminal of the multiply accumulate circuit.

15. The device of claim 14, wherein the control circuit is further configured to, in response to detecting that the skip signal is not asserted, instruct the accumulator circuit to:
add the first value at the input terminal of the accumulator circuit to the accumulated value stored in the accumulator circuit to generate the updated accumulated value;
replace the accumulated value stored in the accumulator circuit with the updated accumulated value; and
provide the updated accumulated value to the output terminal of the accumulator circuit.

16. The device of claim 12, wherein an initial value for the value stored in the skip circuit is equal to the input sum shifted to the right by K−1 bits, wherein K is the number of bits in each of the M weight vectors.

17. A device comprising:
a multiply accumulate circuit comprising:
a multiplier configured to calculate a set of M products by:
receiving a set of M input vectors and a set of M weight vectors, wherein each input vector in the set of M input vectors has a corresponding weight vector in the set of M weight vectors; and
performing an element-wise multiplication between the set of M input vectors and a bit vector of length M, wherein the bit vector comprises weight bits at a first bit location of the set of M weight vectors; and
an adder tree configured to add the set of M products together to calculate a product sum;
an accumulator circuit comprising an accumulator and a shift register, wherein a first input terminal of the accumulator is coupled to an output terminal of the adder tree, a second input terminal of the accumulator is coupled to an output terminal of the shift register, and an input terminal of the shift register is coupled to an output terminal of the accumulator;

a skip circuit, wherein an input terminal of the skip circuit is coupled to the output terminal of the accumulator, wherein the skip circuit is configured to:

receive a value from the output terminal of the accumulator;

compare the value to a threshold value; and in response to detecting that a magnitude of the value is larger than the threshold value, assert a skip signal on an output pin of the skip circuit, wherein the skip circuit is configured to calculate the threshold value by subtracting a shifted input sum from an input sum, wherein the shifted input sum is the input sum shifted by a number of bits based on the first bit location of the weight bits being processed; and a control circuit coupled to the multiply accumulate circuit, the accumulator circuit, and the skip circuit, wherein the control circuit is configured to:

check the skip signal on the output pin of the skip circuit; and in response to detecting that the skip signal is asserted, terminate processing for remaining weight bits of the set of M weight vectors and assert an output ready signal.

18. The device of claim 17, wherein the accumulator circuit is configured to:

subtract a first value at the first input terminal of the accumulator from an accumulated value stored in the shift register to generate an updated accumulated value at the output terminal of the accumulator, when the first bit location is a most significant bit (MSB) location of the set of M weight vectors;

add the first value at the first input terminal of the accumulator to the accumulated value stored in the shift register to generate the updated accumulated value at the output terminal of the accumulator, when the first bit location is not the MSB location of the set of M weight vectors; and replace the accumulated value stored in the shift register with the updated accumulated value.

19. The device of claim 17, wherein the input sum is a sum of the set of M input vectors.

20. The device of claim 17, wherein the skip circuit is further configured to, before comparing the value to the threshold value, adjust the value by adding an adjustment value to the value.

\* \* \* \* \*